(12) United States Patent
Iwanaga et al.

(10) Patent No.: US 12,325,144 B2
(45) Date of Patent: Jun. 10, 2025

(54) REMOTE CONTROL SYSTEM, REMOTE CONTROL METHOD, AND CONTROL PROGRAM

(71) Applicant: TOYOTA JIDOSHA KABUSHIKI KAISHA, Toyota (JP)

(72) Inventors: Yuka Iwanaga, Toyokawa (JP);
Takashi Yamamoto, Seto (JP);
Takemitsu Mori, Nisshin (JP);
Masayoshi Tsuchinaga, Nisshin (JP);
Shintaro Yoshizawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 185 days.

(21) Appl. No.: 18/456,119

(22) Filed: Aug. 25, 2023

(65) Prior Publication Data
US 2024/0075628 A1 Mar. 7, 2024

(30) Foreign Application Priority Data
Sep. 2, 2022 (JP) ................. 2022-140229

(51) Int. Cl.
 B25J 9/16 (2006.01)
 B25J 5/00 (2006.01)
 B25J 13/00 (2006.01)
(52) U.S. Cl.
 CPC ............ B25J 9/1697 (2013.01); B25J 5/007 (2013.01); B25J 13/006 (2013.01)
(58) Field of Classification Search
 None
 See application file for complete search history.

(56) References Cited

U.S. PATENT DOCUMENTS

2021/0178598 A1   6/2021  Yamamoto

FOREIGN PATENT DOCUMENTS

| JP | 2021094605 A |   | 6/2021 | |
|----|--------------|---|--------|-----------|
| JP | 2023131025 A | * | 9/2023 | B25J 13/02 |
| JP | 2024025147 A | * | 2/2024 | B25J 13/06 |

OTHER PUBLICATIONS

English translation of JP-2024025147-A (Year: 2024).*
English translation of JP-2023131025-A (Year: 2023).*

* cited by examiner

*Primary Examiner* — Thomas E Worden
*Assistant Examiner* — Bryant Tang
(74) *Attorney, Agent, or Firm* — Dinsmore & Shohl LLP

(57) ABSTRACT

A remote control system includes: a recognition unit configured to recognize, based on a shot image, objects that can be grasped, and movable and immovable areas of a device to be operated; an operation terminal configured to receive handwritten information; and an estimation unit configured to estimate an object to be grasped requested to be grasped and estimate a content of a motion with regard to the object to be grasped which is requested to be performed by the device to be operated, in which the estimation unit estimates, a conveyance route positioned in the movable area of the device to be operated among the conveyance routes as a moving route of the device to be operated and estimates a conveyance route positioned in the immovable area of the device to be operated as a moving route of an end effector that grasps the object to be grasped.

13 Claims, 22 Drawing Sheets

| HANDWRITTEN INFORMATION (IMAGE) | | | | HANDWRITTEN INFORMATION (MEANING) |
|---|---|---|---|---|
| ◇ | ⌒ | ╱ | | HOLD SOMETHING |
| OPEN | OPEN | OPEN | OPENING | OPEN SOMETHING |
| | | (DESTINATION) | | CONVEY SOMETHING |
| ⋮ | | | | ⋮ |

Fig. 12

| HANDWRITTEN INFORMATION (IMAGE) ||| HANDWRITTEN INFORMATION (MEANING) |
|---|---|---|---|
| ⬜ | ⌒ | ⋀ | HOLD FROM ABOVE |
| ⊐ | ⊃ | ⋗ | HOLD FROM SIDE |
| ◇ | ⌒ | ⋀ | HOLD FROM DIAGONALLY ABOVE |
| ⋮ | ⋮ | ⋮ | ⋮ |

Fig. 13

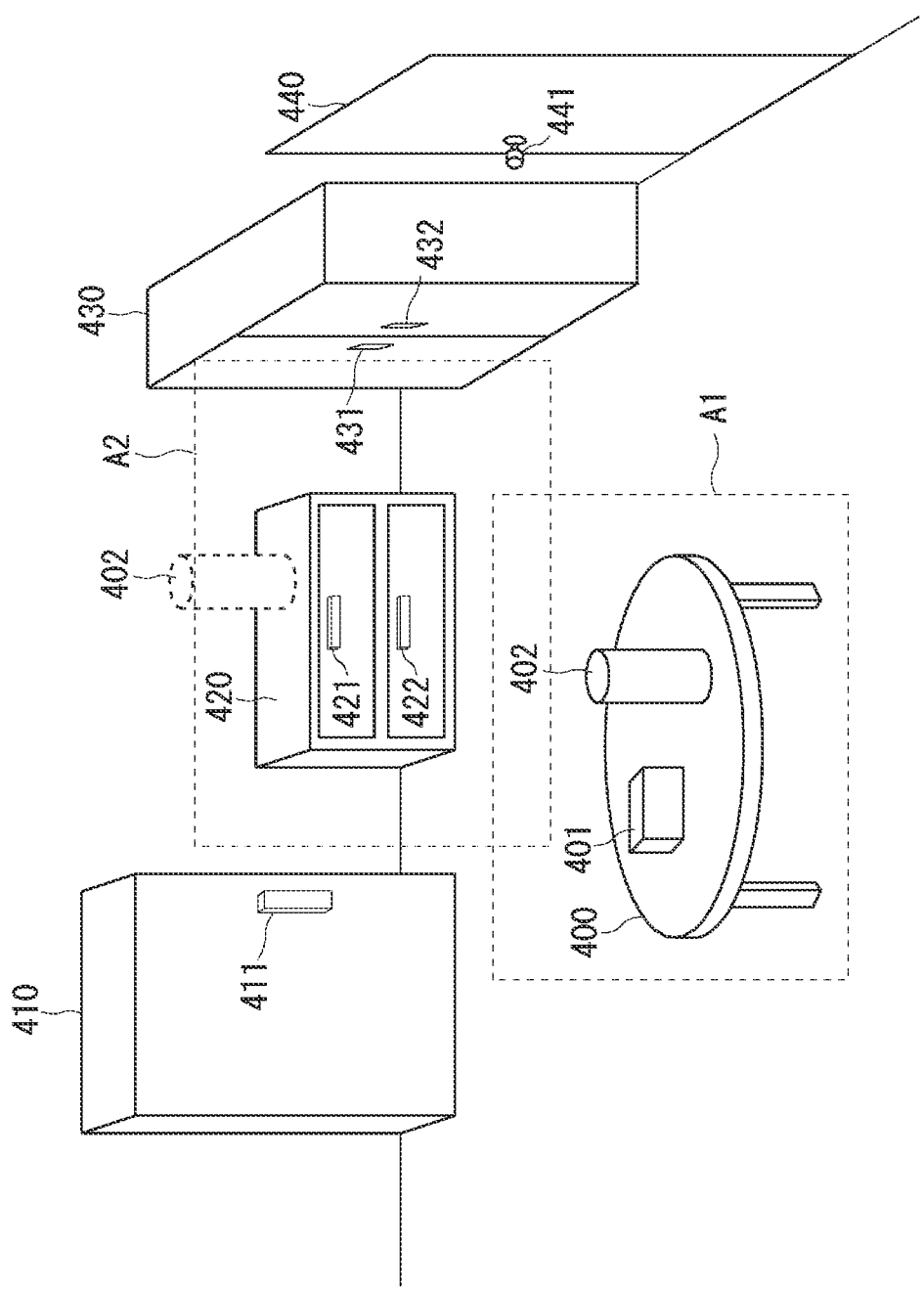

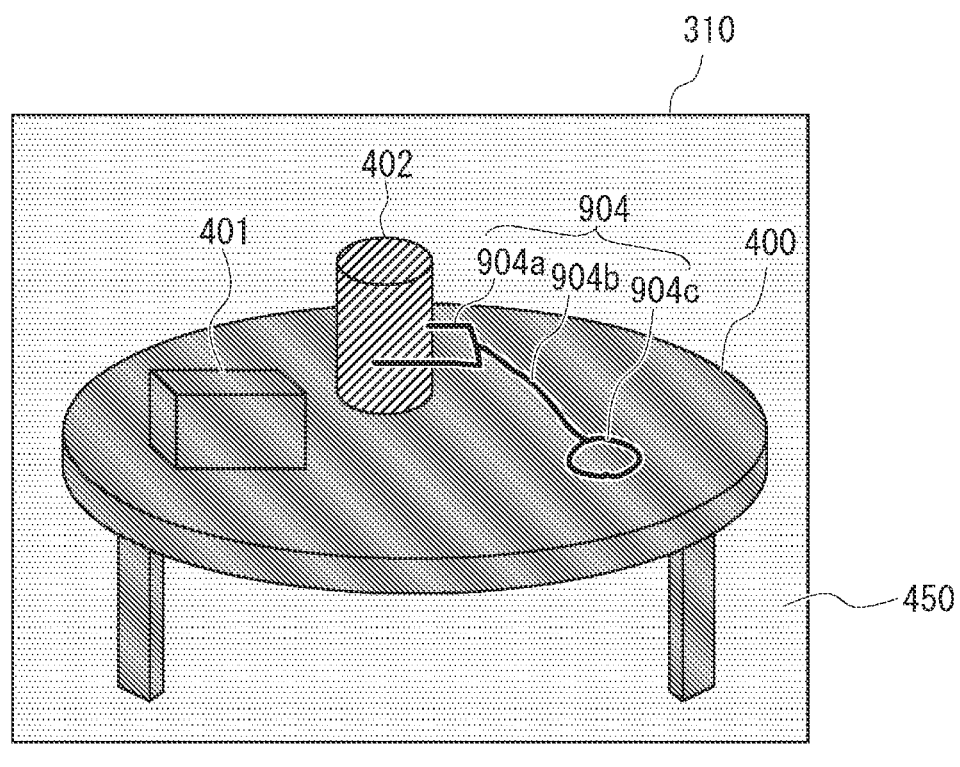
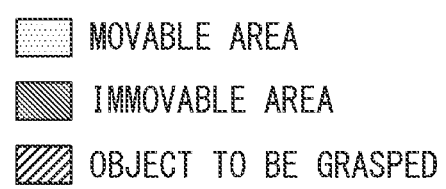
Fig. 20

REMOTE CONTROL SYSTEM, REMOTE CONTROL METHOD, AND CONTROL PROGRAM

CROSS REFERENCE TO RELATED APPLICATIONS

This application is based upon and claims the benefit of priority from Japanese patent application No. 2022-140229, filed on Sep. 2, 2022, the disclosure of which is incorporated herein in its entirety by reference.

BACKGROUND

The present disclosure relates to a remote control system, a remote control method, and a control program.

A technique is known in which a user remotely operates a device to be operated including an end effector, such as a robot or the like including a grasping part (e.g., a hand or a suction part) at the tip of its arm as an end effector, to thereby cause the device to be operated to perform a grasping motion or the like. For example, Japanese Unexamined Patent Application Publication No. 2021-094605 discloses a system for determining a way of controlling a robot based on user's handwritten information received by an operation terminal which displays the shot image obtained by shooting an image of the periphery of a robot and remotely controlling the robot. According to this system, a robot can be remotely controlled by an intuitive instruction by handwriting by a user.

SUMMARY

However, in the system disclosed in Japanese Unexamined Patent Application Publication No. 2021-094605, when handwritten information includes information on a conveyance route of an object to be grasped, it is not determined whether this conveyance route indicates a moving route (traveling route) of the robot or a moving route of an end effector by an arm operation of a robot, which causes a problem that it is impossible to cause a robot (device to be operated) to execute highly accurate processing.

The present disclosure has been made in order to solve the aforementioned problem, and provides a remote control system, a remote control method, and a control program capable of causing a device to be operated to execute highly accurate processing while also allowing a user to perform an intuitive operation.

A remote control system according to the present disclosure is a remote control system configured to remotely control a device to be operated including an end effector, the remote control system including: an imaging unit configured to shoot an image of an environment in which the device to be operated is located; a recognition unit configured to recognize objects that can be grasped by the end effector, a movable area of the device to be operated, and an immovable area of the device to be operated based on the shot image of the environment; an operation terminal configured to display the shot image and receive handwritten information input to the shot image; and an estimation unit configured to estimate, based on the objects that can be grasped and the handwritten information, an object to be grasped which has been requested to be grasped by the end effector from among the objects that can be grasped and estimate a content of a motion with regard to the object to be grasped which is requested to be performed by the device to be operated, in which the estimation unit estimates, when the handwritten information includes information on conveyance routes of the object to be grasped, a conveyance route that is positioned in the movable area of the device to be operated among the conveyance routes as a moving route of the device to be operated and estimates a conveyance route that is positioned in the immovable area of the device to be operated as a moving route of the end effector that grasps the object to be grasped. According to this remote control system, a user performs more intuitive handwriting without him/her being required to recollect predetermined instruction figures and input them by handwriting, whereby it is possible to have a device to be operated perform desired processing such as conveying an object to be grasped. Further, according to this remote control system, when handwritten information includes information on a conveyance route of an object to be grasped, it is automatically determined whether the conveyance route indicates a moving route (traveling route) of a device to be operated or a moving route of an end effector, whereby this remote control system is able to cause a device to be operated to execute highly accurate processing while also allowing a user to perform an intuitive operation.

The estimation unit may further estimate, in a case in which the handwritten information includes information on conveyance routes of the object to be grasped and there is the immovable area held between the two movable areas on the conveyance route, a detour route of the object to be grasped where there is no immovable area held between the two movable areas, and the remote control system may further include an output unit configured to output information on the detour route estimated by the estimation unit.

The output unit may cause the operation terminal to display the information on the detour route.

The recognition unit may recognize objects that can be grasped other than the object to be grasped among the objects that can be grasped as an immovable area of the device to be operated.

The device to be operated may be an autonomously movable robot.

The estimation unit may estimate, when the handwritten information includes information on the conveyance routes of the object to be grasped, a conveyance route that is positioned in the movable area of the device to be operated among the conveyance routes as the moving route of the robot, which is the device to be operated, and estimates a conveyance route that is positioned in the immovable area of the device to be operated as a moving route of the end effector attached to a tip of an arm of the robot by an operation of the arm.

The imaging unit may be attached to the device to be operated.

The imaging unit may be provided in a place in the environment in which the device to be operated is located other than the place where the device to be operated is located in this environment.

The operation terminal may complete the input of the handwritten information upon receiving a predetermined handwriting end operation by a user.

The handwritten information may include a first image that simulates a content of a motion of the device to be operated with regard to the object to be grasped.

The estimation unit may estimate the content of the motion with regard to the object to be grasped which is requested to be performed by the device to be operated from the first image of the handwritten information using a learned model such as a neural network learned by deep learning.

A remote control method according to the present disclosure is a remote control method by a remote control system configured to remotely control a device to be operated including an end effector, the remote control method including: shooting an image of an environment in which the device to be operated is located; recognizing, based on the shot image of the environment, objects that can be grasped by the end effector, a movable area of the device to be operated, and an immovable area of the device to be operated; receiving, in an operation terminal that displays the shot image, handwritten information input to the displayed shot image; and estimating, based on the objects that can be grasped and the handwritten information, an object to be grasped which has been requested to be grasped by the end effector from among the objects that can be grasped and estimating a content of a motion with regard to the object to be grasped which is requested to be performed by the device to be operated, in which in the estimation of the content of the motion with regard to the object to be grasped which is requested to be performed by the device to be operated, when the handwritten information includes information on conveyance routes of the object to be grasped, a conveyance route that is positioned in the movable area of the device to be operated among the conveyance routes is estimated as a moving route of the device to be operated and a conveyance route that is positioned in the immovable area of the device to be operated is estimated as a moving route of the end effector that grasps the object to be grasped. According to this remote control method, a user performs more intuitive handwriting without him/her being required to recollect predetermined instruction figures and input them by handwriting, whereby it is possible to have a device to be operated perform desired processing such as conveying an object to be grasped. Further, according to this remote control method, when handwritten information includes information on a conveyance route of an object to be grasped, it is automatically determined whether the conveyance route indicates a moving route (traveling route) of a device to be operated or a moving route of an end effector, whereby this remote control method is able to cause a device to be operated to execute highly accurate processing while also allowing a user to perform an intuitive operation.

A control program according to the present disclosure is a control program for causing a computer to execute remote control processing by a remote control system configured to remotely control a device to be operated including an end effector, the control program further causing a computer to perform the processing of: shooting an image of an environment in which the device to be operated is located; recognizing, based on the shot image of the environment, objects that can be grasped by the end effector, a movable area of the device to be operated, and an immovable area of the device to be operated; receiving, in an operation terminal that displays the shot image, handwritten information input to the displayed shot image; and estimating, based on the objects that can be grasped and the handwritten information, an object to be grasped which has been requested to be grasped by the end effector from among the objects that can be grasped and estimating a content of a motion with regard to the object to be grasped which is requested to be performed by the device to be operated, in which in the processing of estimating the content of the motion with regard to the object to be grasped which is requested to be performed by the device to be operated, when the handwritten information includes information on conveyance routes of the object to be grasped, a conveyance route that is positioned in the movable area of the device to be operated among the conveyance routes is estimated as a moving route of the device to be operated and a conveyance route that is positioned in the immovable area of the device to be operated is estimated as a moving route of the end effector that grasps the object to be grasped. According to this control program, a user performs more intuitive handwriting without him/her being required to recollect predetermined instruction figures and input them by handwriting, whereby it is possible to have a device to be operated perform desired processing such as conveying an object to be grasped. Further, according to this control program, when handwritten information includes information on a conveyance route of an object to be grasped, it is automatically determined whether the conveyance route indicates a moving route (traveling route) of a device to be operated or a moving route of an end effector, whereby this control program is able to cause a device to be operated to execute highly accurate processing while also allowing a user to perform an intuitive operation.

According to the present disclosure, it is possible to provide a remote control system, a remote control method, and a control program capable of causing a device to be operated to execute highly accurate processing while also allowing a user to perform an intuitive operation.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 12 is a diagram showing an example of teaching data for a second learned model;

FIG. 13 is a diagram showing an example of teaching data for the second learned model;

FIG. 16 is a diagram showing an example of the first environment in which the robot is located;

FIG. 20 is a diagram showing an example of movable and immovable areas of the robot recognized by a recognition unit;

DESCRIPTION OF EMBODIMENTS

Hereinafter, although the present disclosure will be described with reference to embodiment of the present disclosure, the present disclosure according to claims is not limited to the following embodiment. Further, all the components described in the following embodiment are not necessarily essential as means for solving problems. Further, in the following embodiment, a robot including a hand at the tip of its arm as an end effector will be described as an example of a device to be operated, but the device to be operated is not limited thereto.

First Embodiment

Figure 1:
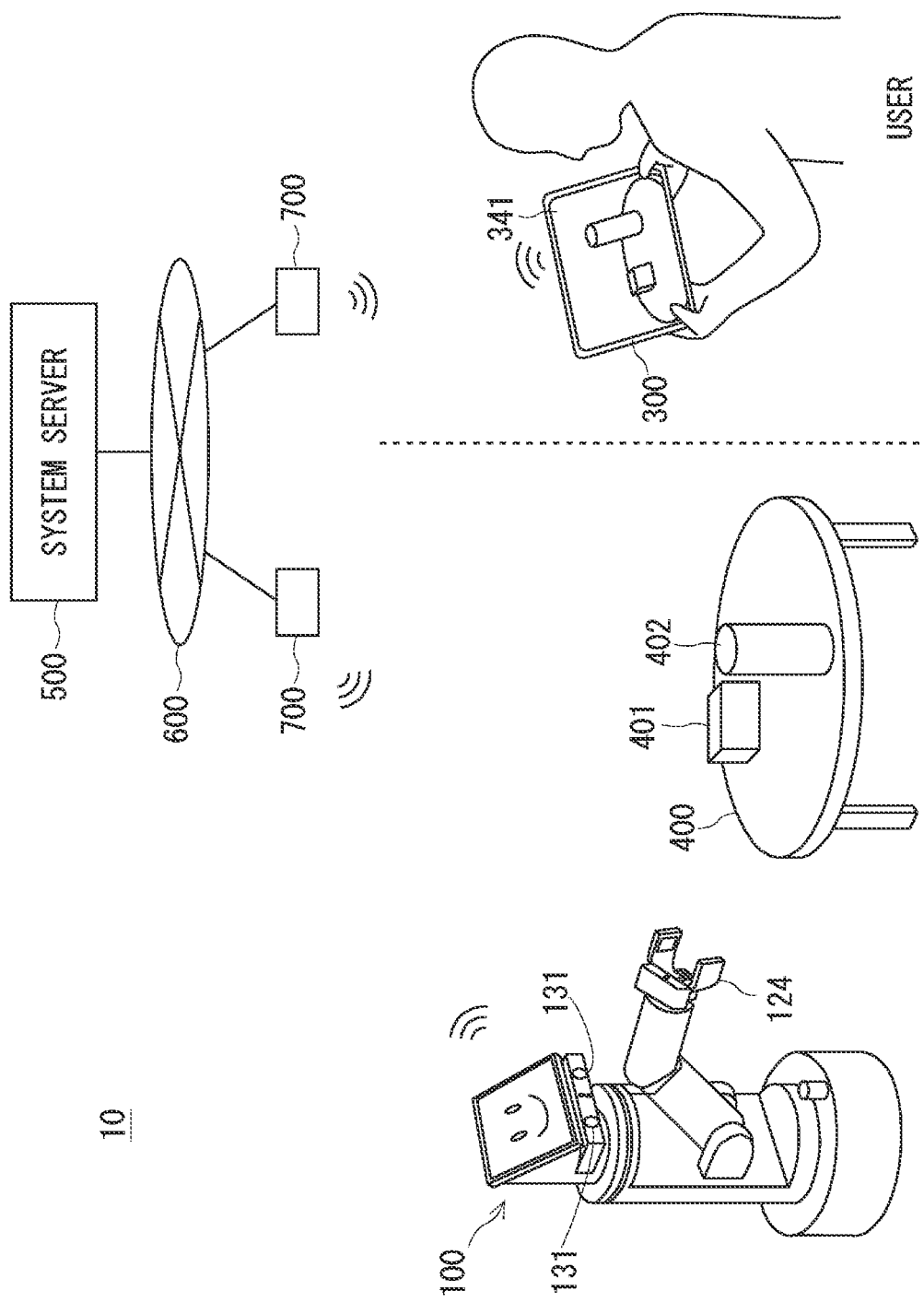
FIG. 1 is a conceptual diagram showing an example of an overall environment in which a remote control system according to a first embodiment is used.

FIG. 1 is a conceptual diagram showing an example of an overall environment in which a remote control system 10 according to a first embodiment is used. A robot 100 that performs various kinds of motions in a first environment is remotely controlled via a system server 500 connected to an Internet 600 by allowing a user who is a remote operator present in a second environment distant from the first environment to operate a remote terminal 300 (an operation terminal).

In the first environment, the robot 100 is connected to the Internet 600 via a wireless router 700. Further, in the second environment, the remote terminal 300 is connected to the Internet 600 via the wireless router 700. The system server 500 is connected to the Internet 600. The robot 100 performs, for example, motions for grasping an object to be grasped by a hand 124 or conveyance motions of the object to be grasped from a current location to a destination according to the operation of the remote terminal 300 by the user.

Note that, in this embodiment, motions for grasping the object to be grasped by the hand 124 are not limited to motions for simply grasping (holding) an object to be grasped, but also include, for example, the following motions.

a motion for holding and lifting an object to be grasped a motion for, when an object to be grasped is a knob for a door or a drawer of a cabinet or the like, holding the knob and then opening and closing the door or the drawer a motion for, when an object to be grasped is a door knob of a door, holding the door knob and then opening and closing the door Further, in this embodiment, the conveyance motions of the object to be grasped from the current location to the destination include, for example, a motion for conveying the object to be grasped by traveling of the robot 100 or a motion for conveying the object to be grasped by the hand 124 by, for example, an arm operation.

The robot 100 shoots an image of the first environment in which the robot 100 is located using a stereo camera 131 (an imaging unit) and transmits the shot image to the remote terminal 300 via the Internet 600. Further, the robot 100 recognizes objects that can be grasped by the hand 124 based on the shot image.

Figure 2:
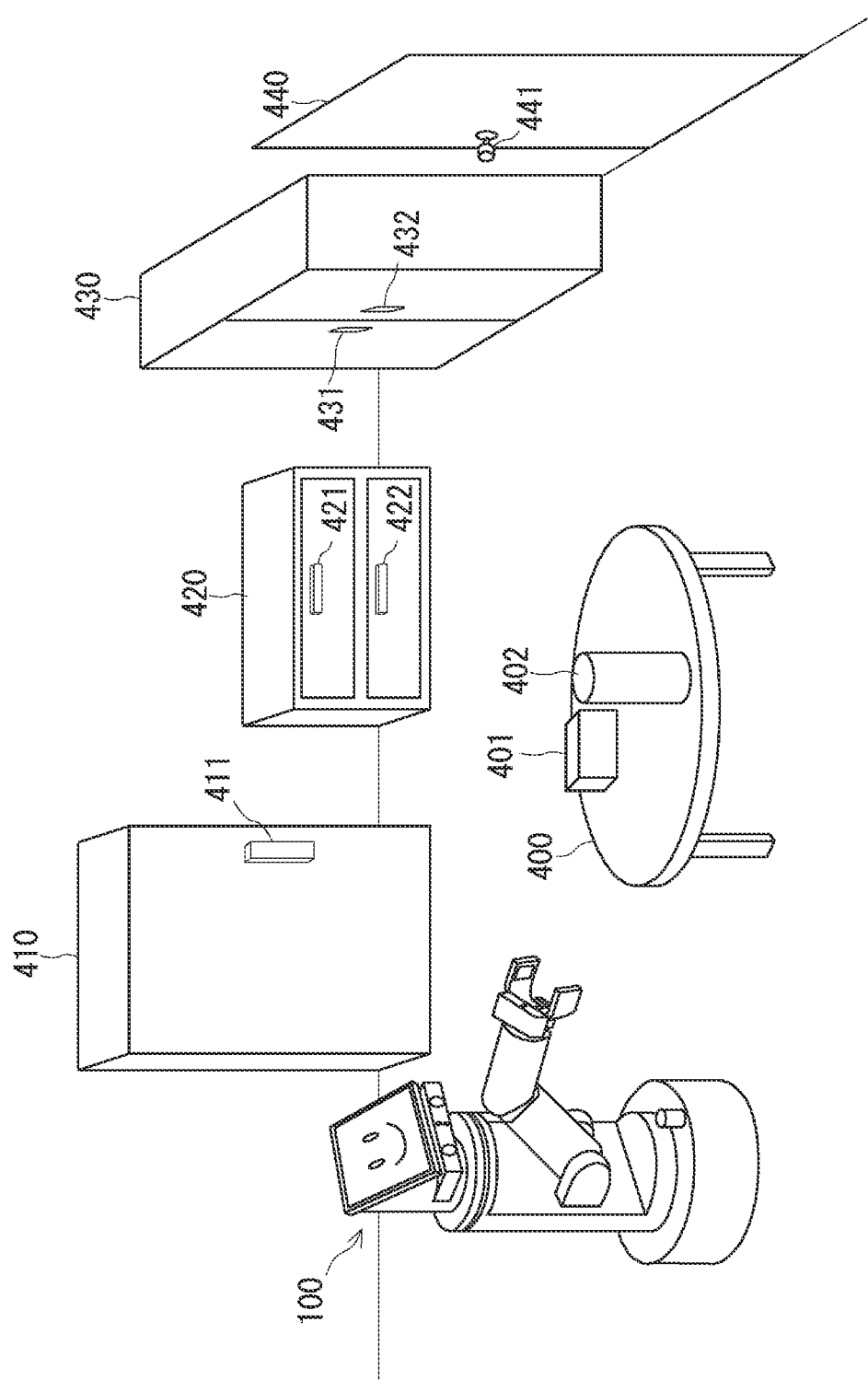
FIG. 2 is a diagram showing an example of a first environment in which a robot is located.

FIG. 2 is a diagram showing an example of the first environment in which the robot 100 is located. In the example shown in FIG. 2, a table 400, cabinets 410, 420, and 430, and a door 440 are located in the first environment. The objects that can be grasped located in the first environment are objects 401 and 402 placed on the table 400, a knob 411 of the cabinet 410, knobs 421 and 422 of the cabinet 420, knobs 431 and 432 of the cabinet 430, and a door knob 441 of the door 440.

The remote terminal 300 is, for example, a tablet terminal, and includes a display panel 341 on which a touch panel is superimposed. The shot image received from the robot 100 is displayed on the display panel 341, and thus a user can indirectly view the first environment in which the robot 100 is located. Further, a user can input handwritten information, which is an image (a first image) that simulates a content of a motion of the robot 100 with regard to the object to be grasped to the shot image displayed on the display panel 341 by handwriting.

Figure 3:
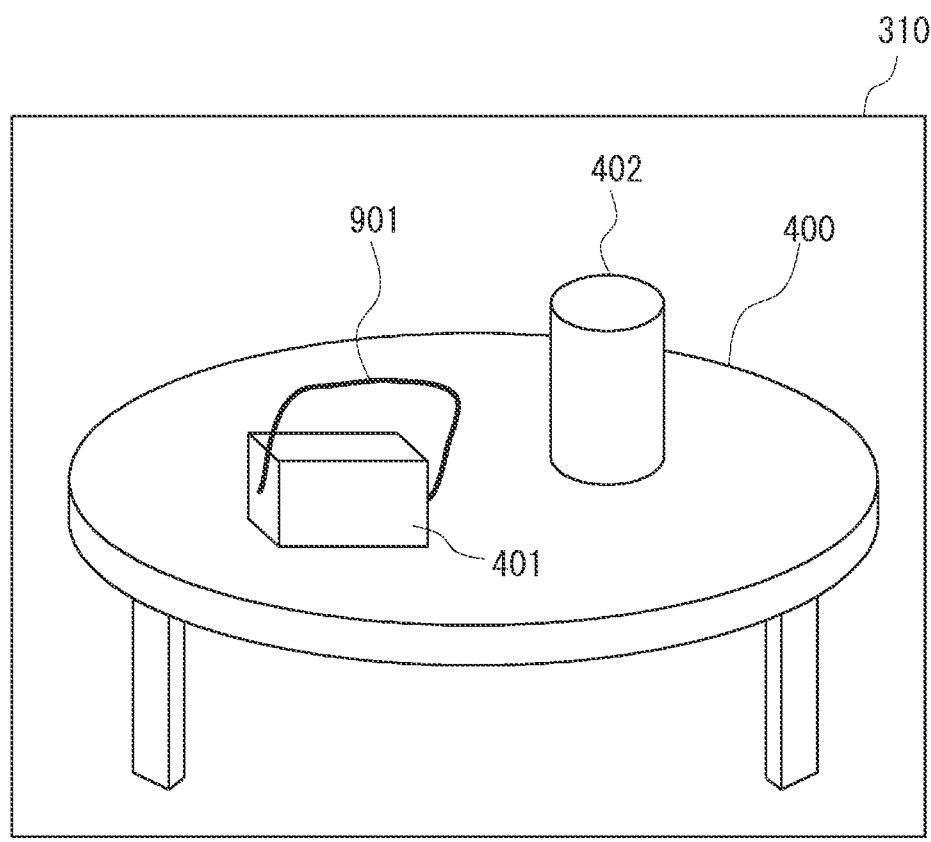
FIG. 3 is a diagram showing an example of handwritten information.
Figure 4:
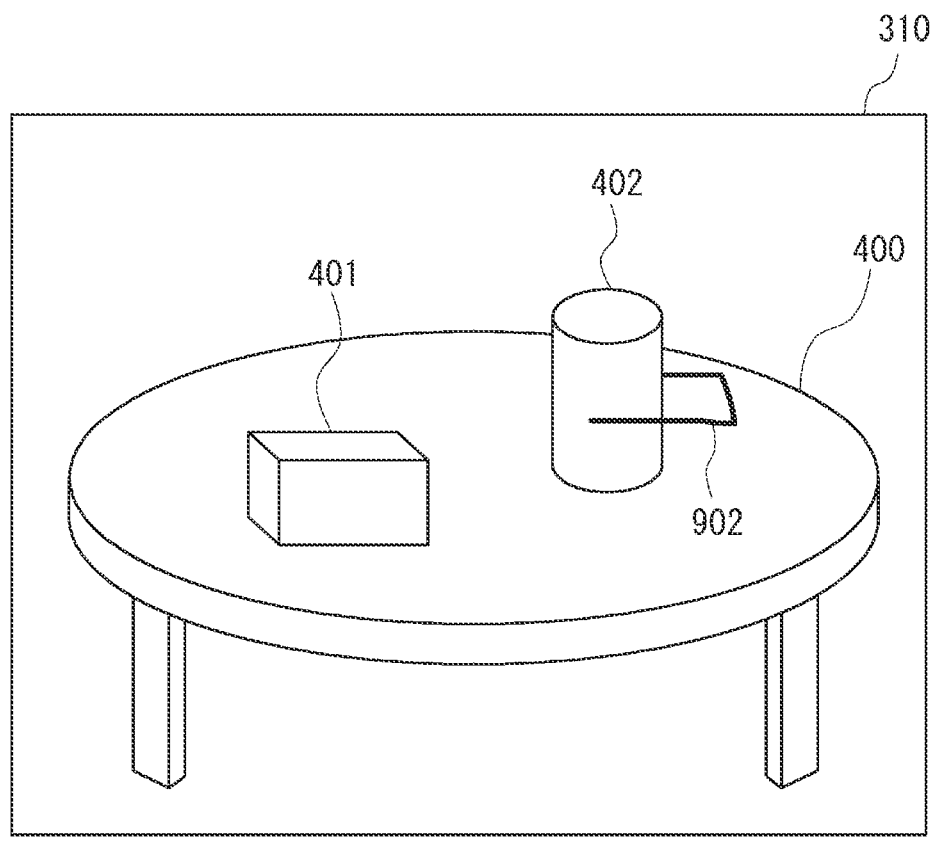
FIG. 4 is a diagram showing an example of handwritten information.
Figure 5:
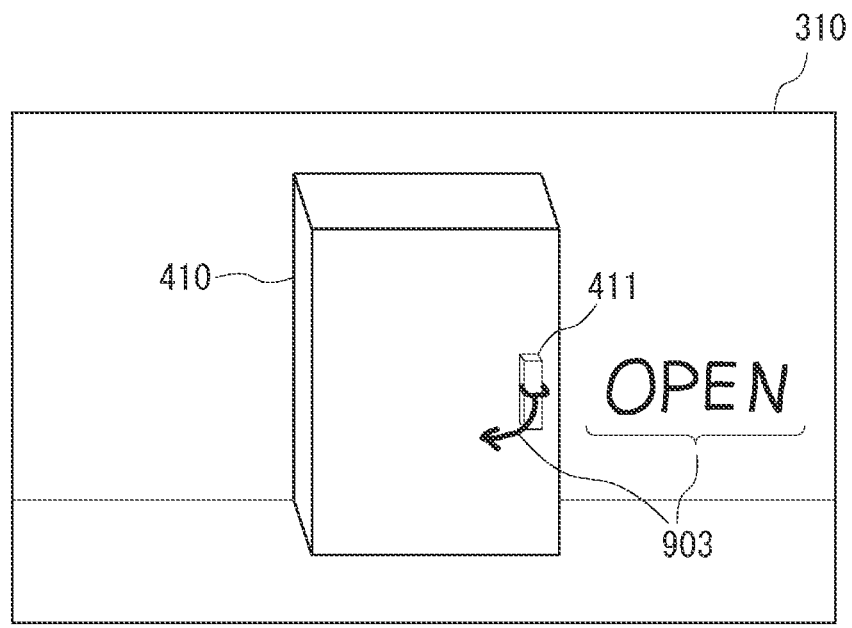
FIG. 5 is a diagram showing an example of handwritten information.
Figure 6:
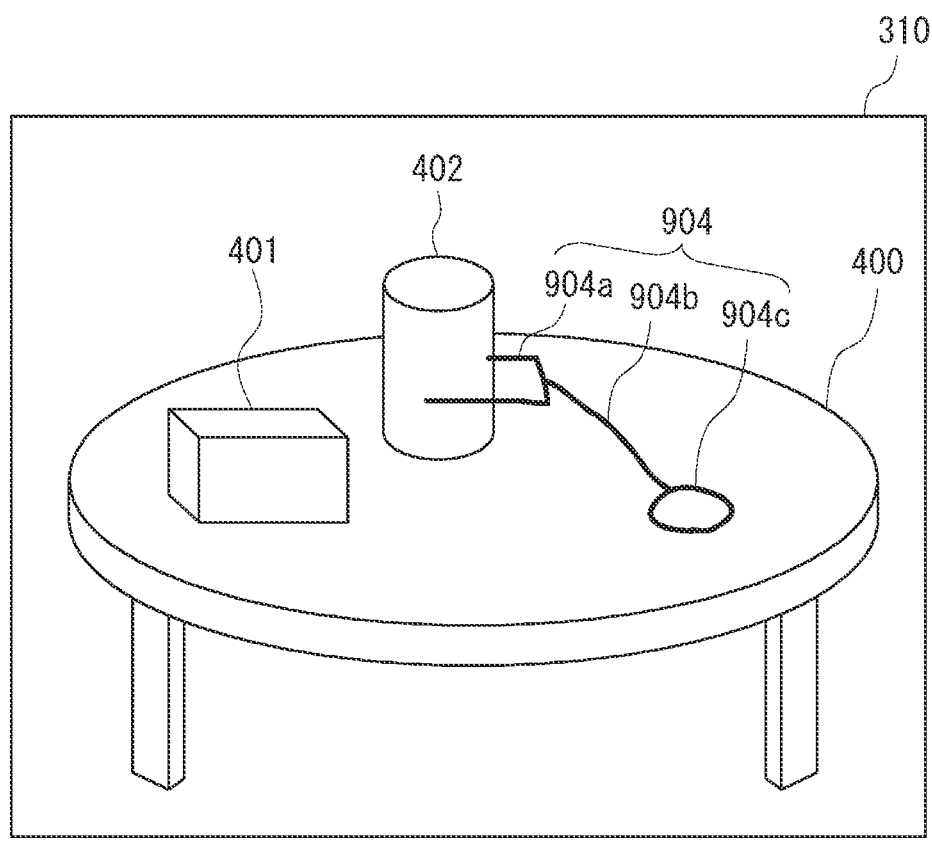
FIG. 6 is a diagram showing an example of handwritten information.

As a method for inputting the handwritten information, for example, a method in which the relevant part of the shot image on a touch panel disposed so as to be superimposed on the display panel 341 is touched with a finger of a user, a touch pen, or the like can be used, but the method therefor is not limited to this. Each of FIGS. 3 to 6 is a diagram showing an example of handwritten information input to the shot image 310. The example shown in FIG. 3 shows handwritten information 901 that simulates grasping the object 401 having a rectangular parallelepiped shape placed on the table 400 from above. The example of FIG. 4 shows handwritten information 902 that simulates grasping the object 402 having a columnar shape placed on the table 400 from the side. The example of FIG. 5 shows handwritten information 903 that simulates grasping the knob 411 of the cabinet 410 and then opening the door. The example of FIG. 6 shows handwritten information 904 that simulates grasping the object 402 having a columnar shape placed on the table 400 from the side and moving the grasped object 402 to another position on the table 400. Note that the handwritten information 904 includes handwritten information 904a that simulates grasping the object 402 having a columnar shape from the side, handwritten information 904b that simulates a conveyance route of the object 402, and handwritten information 904c that simulates a moving destination (destination) of the object 402. As shown in each of FIGS. 3 to 6, the image of the handwritten information may be an image consisting of only figures such as lines, or an image consisting of a combination of figures such as lines and characters. The handwritten information which a user has input to the shot image is transmitted to the robot 100 via the Internet 600.

The remote terminal 300 is not limited to a tablet terminal, and the handwritten information input to the remote terminal 300 is not limited to being input by a user touching a touch panel with his/her finger, a touch pen, or the like. The remote terminal 300 may be, for example, a Virtual Reality (VR) goggle, and the handwritten information input to the remote terminal 300 may be input to the shot image displayed on the VR goggle by a user who wears the VR goggle operating a VR controller.

The robot 100 estimates, based on objects that can be grasped which have been recognized from the shot image and handwritten information which a user has input to the shot image, an object to be grasped which has been requested to be grasped by the hand 124 from among the objects that can be grasped and estimates a content of a motion with regard to the object to be grasped which is requested to be performed by the robot 100. Note that the content of the motion with regard to the object to be grasped which is requested to be performed by the robot 100 includes, for example, a way of performing a motion for grasping the object to be grasped by the hand 124 or a way of performing a motion for conveying the object to be grasped from the current location to the destination.

Figure 7:
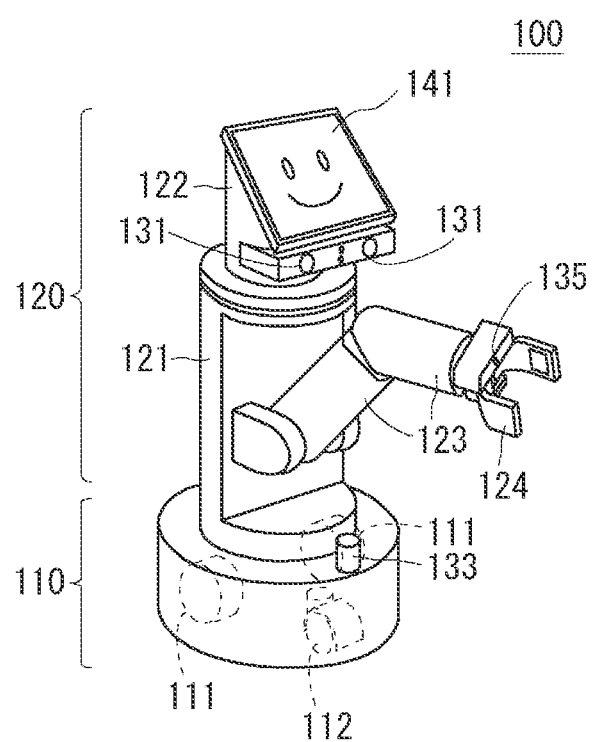
FIG. 7 is an external perspective view showing an example of an external configuration of a robot.

FIG. 7 is an external perspective view showing an example of an external configuration of the robot 100. The robot 100 includes, mainly, a movable base part 110 and a main-body part 120. The movable base part 110 supports two driving wheels 111 and a caster 112, each of which is in contact with a traveling surface, inside its cylindrical housing. The two driving wheels 111 are arranged so that the centers of their rotation axes coincide with each other. Each of the driving wheels 111 is rotationally driven by a motor (not shown) independently of each other. The caster 112 is a driven wheel and is disposed so that its pivotal axis extending from the movable base part 110 in the vertical direction axially supports the wheel at a place away from its rotation axis. Further, the caster 112 follows the movement of the movable base part 110 so as to move in the moving direction of the movable base part 110.

The movable base part 110 includes a laser scanner 133 in a peripheral part of its top surface. The laser scanner 133 scans a certain range on the horizontal plane at intervals of a certain stepping angle and outputs information as to whether or not there is an obstacle in each direction. Further, when there is an obstacle, the laser scanner 133 outputs a distance to the obstacle.

The main-body part 120 includes, mainly, a body part 121 mounted on the top surface of the movable base part 110, a head part 122 placed on the top surface of the body part 121, an arm 123 supported on the side surface of the body part 121, and the hand 124 disposed at the tip of the arm 123. The arm 123 and the hand 124 are driven by motors (not shown) and grasp an object to be grasped. The body part 121 is able to rotate around a vertical axis with respect to the movable base part 110 by a driving force of a motor (not shown).

The head part 122 mainly includes the stereo camera 131 and a display panel 141. The stereo camera 131 has a configuration in which two camera units having the same angle of view are arranged away from each other, and outputs imaging signals of images shot by the respective camera units.

The display panel 141 is, for example, a liquid crystal display panel, and displays an animated face of a pre-defined character and displays information about the robot 100 in the form of text or by using icons. By displaying the face of the character on the display panel 141, it is possible to impart an impression that the display panel 141 is a pseudo face part to people around the robot 100.

The head part 122 is able to rotate around a vertical axis with respect to the body part 121 by a driving force of a motor (not shown). Thus, the stereo camera 131 can shoot an image in any direction. Further, the display panel 141 can show displayed contents in any direction.

Figure 8:
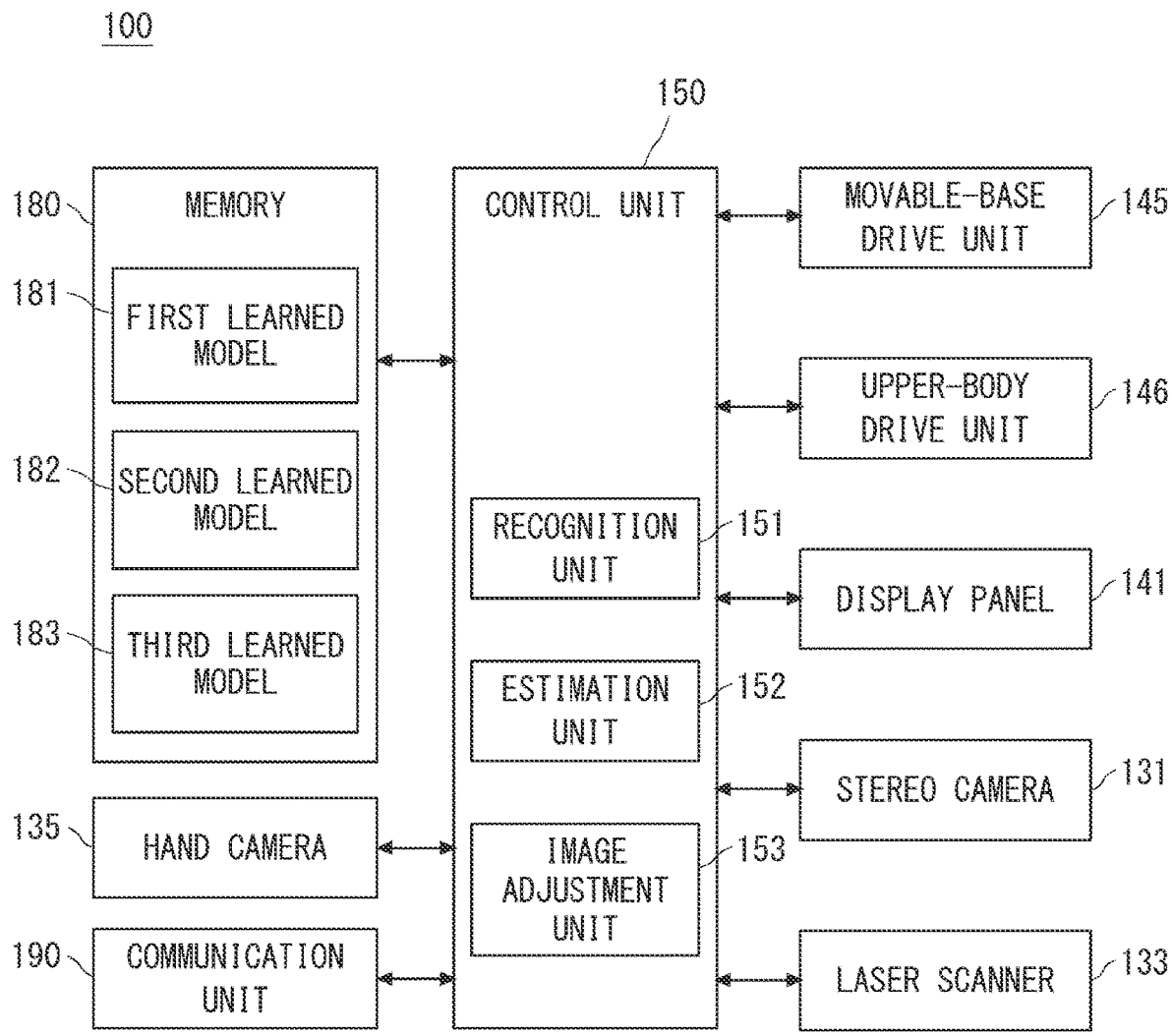
FIG. 8 is a block diagram showing an example of a block configuration of the robot.

FIG. 8 is a block diagram showing an example of a block configuration of the robot 100. Main elements related to an estimation of an object to be grasped and an estimation of a content of a motion with regard to the object to be grasped by the robot 100 will be described below. However, the robot 100 includes elements in its configuration other than the above ones and may include additional elements that contribute to the estimation of the object to be grasped and the estimation of the content of the motion with regard to the object to be grasped by the robot 100.

A control unit 150 is, for example, a CPU and is included in a control unit disposed in the body part 121. A movable-base drive unit 145 includes the driving wheels 111, and a driving circuit and motors for driving the driving wheels 111. The control unit 150 performs rotation control of the driving wheels by sending a driving signal to the movable-base drive unit 145. Further, the control unit 150 receives a feedback signal such as an encoder signal from the movable-base drive unit 145 and recognizes a moving direction and a moving speed of the movable base part 110.

An upper-body drive unit 146 includes the arm 123 and the hand 124, the body part 121, the head part 122, and driving circuits and motors for driving these components. The control unit 150 performs a grasping motion and a gesture by transmitting a driving signal to the upper-body drive unit 146. Further, the control unit 150 receives a feedback signal such as an encoder signal from the upper-body drive unit 146, and recognizes positions and moving speeds of the arm 123 and the hand 124, and orientations and rotation speeds of the body part 121 and the head part 122.

The display panel 141 receives an image signal generated by the control unit 150 and displays an image thereof. Further, as described above, the control unit 150 generates an image signal of the character or the like and causes an image thereof to be displayed on the display panel 141.

The stereo camera 131 shoots an image of the first environment in which the robot 100 is located in accordance with a request from the control unit 150 and passes an obtained imaging signal to the control unit 150. The control unit 150 performs image processing by using the imaging signal and converts the imaging signal into the shot image in a predetermined format. The laser scanner 133 detects whether or not there is an obstacle in the moving direction of the robot 100 in accordance with a request from the control unit 150 and passes a detection signal, which is a result of the detection, to the control unit 150.

A hand camera 135 is, for example, a distance image sensor, and is used to recognize a distance to an object to be grasped, a shape of an object to be grasped, a direction of an object to be grasped, and the like. The hand camera 135 includes an image pickup device in which pixels for performing a photoelectrical conversion of an optical image incident from a target space are two-dimensionally arranged, and outputs a distance to the subject to the control unit 150 for each of the pixels. Specifically, the hand camera 135 includes an irradiation unit that irradiates a pattern light to the target space, and receives the reflected light of the pattern light by the image pickup device to output a distance to the subject captured by each of the pixels based on a distortion and a size of the pattern in the image. Note that the control unit 150 recognizes a state of a wider surrounding environment by the stereo camera 131 and recognizes a state in the vicinity of the object to be grasped by the hand camera 135.

A memory 180 is a nonvolatile storage medium and may be, for example, a solid-state drive. The memory 180 stores, in addition to a control program for controlling the robot 100, various parameter values, functions, lookup tables, and the like used for the control and the calculation. In particular, the memory 180 stores a first learned model 181 that uses the shot image as an input image and outputs objects that can be grasped shown in the shot image, a second learned model 182 that uses an image of handwritten information as an input image and outputs the meaning of the content of the motion of the robot 100 simulated by the handwritten information, and a third learned model 183 that uses the shot image as an input image and outputs movable and immovable areas of the robot 100 shown in the shot image.

A communication unit 190 is, for example, a wireless LAN unit and performs radio communication with the wireless router 700. The communication unit 190 receives the handwritten information sent from the remote terminal 300 and passes it to the control unit 150. Further, the communication unit 190 transmits the shot image shot by the stereo camera 131 to the remote terminal 300 under the control of the control unit 150.

The control unit 150 performs control of the whole robot 100 and various kinds of calculation processing by executing a control program read from the memory 180. Further, the control unit 150 also serves as a function execution unit that executes various calculations and controls related to the control. As such function execution units, the control unit 150 includes a recognition unit 151, an estimation unit 152, and an image adjustment unit 153.
(Details of Recognition Unit 151)

The recognition unit 151 mainly extracts areas that can be grasped by the hand 124 shown in the shot image shot by the stereo camera 131, and recognizes the extracted areas as objects that can be grasped. Hereinafter, a detailed description will be given.

First, the recognition unit 151 extracts areas that can be grasped by the hand 124 shown in the shot image shot by the stereo camera 131 using the first learned model 181 read from the memory 180, and recognizes the extracted areas as the objects that can be grasped.

Figure 9:
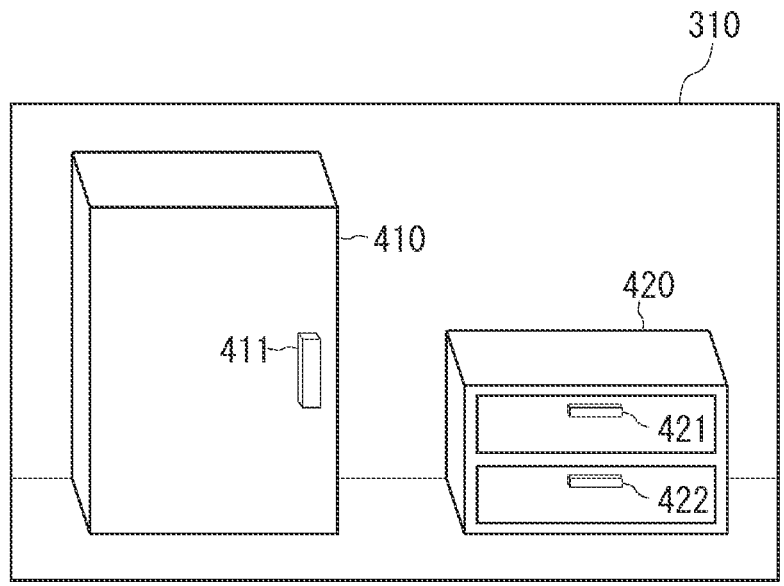
FIG. 9 is a diagram showing an example of the shot image acquired by the robot.

FIG. 9 is a diagram showing an example of the shot image 310 of the first environment which the robot 100 has acquired by the stereo camera 131. The shot image 310 in FIG. 9 shows the cabinet 410 having the knob 411 and the cabinet 420 having the knobs 421 and 422. The recognition unit 151 provides the shot image 310 to the first learned model 181 as an input image.

Figure 10:
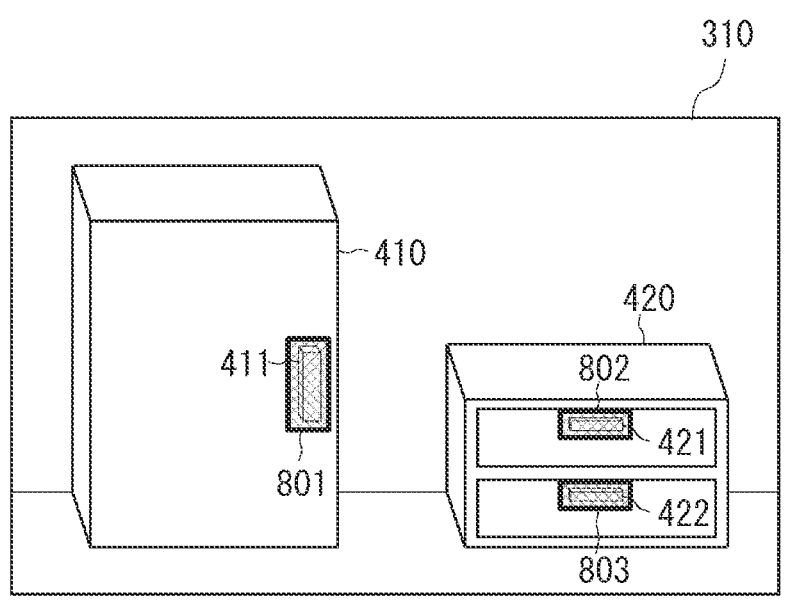
FIG. 10 is a diagram showing an example of an area that can be grasped which a first learned model outputs.

FIG. 10 is a diagram showing an example of the areas that can be grasped output by the first learned model 181 when the shot image 310 shown in FIG. 9 is used as an input image. Specifically, an area that surrounds the knob 411 is detected as an area 801 that can be grasped, an area that surrounds the knob 421 is detected as an area 802 that can be grasped, and an area that surrounds the knob 422 is detected as an area 803 that can be grasped. Thus, the recognition unit 151 recognizes each of the knobs 411, 421, and 422, which are surrounded by the respective areas 801, 802, and 803 that can be grasped, as an object that can be grasped.

The first learned model 181 is a neural network learned from teaching data which is a combination of an image showing objects that can be grasped by the hand 124 and a correct answer to which area of the image is the object that can be grasped. At this time, by performing learning by teaching data including information regarding the distances of the objects that can be grasped and the directions in which the objects that can be grasped are located shown in the image, the first learned model 181 is able to extract not only the objects that can be grasped from the shot image but also information regarding the distances of the objects that can be grasped and the directions in which the objects that can be grasped are located. The first learned model 181 may be a neural network learned by deep learning. Further, teaching data may be added to the first learned model 181 as necessary so that it performs additional learning.

Further, the recognition unit 151 recognizes not only objects that can be grasped but also movable and immovable areas of the robot 100. A flow of processing for recognizing the movable and immovable areas of the robot 100 by the recognition unit 151 is basically similar to the case of processing for recognizing objects that can be grasped.

That is, the recognition unit 151 extracts movable and immovable areas of the robot 100 shown in the shot image shot by the stereo camera 131 using the third learned model 183 read from the memory 180 and recognizes them. Here, the third learned model 183 is a neural network learned from teaching data which is a combination of an image showing the movable area of the robot 100 and a correct answer to which area of the image is a movable area of the robot 100, and leaned from teaching data which is a combination of an image showing the immovable area of the robot 100 and a correct answer to which area of the image is an immovable area of the robot 100.
(Details of Estimation Unit 152)

The estimation unit 152 estimates an object to be grasped which has been requested to be grasped by the hand 124 from among the objects that can be grasped which the recognition unit 151 has recognized and estimates a content of a motion with regard to the object to be grasped which is requested to be performed by the robot 100. Hereinafter, a detailed description thereof will be given.

First, the estimation unit 152 estimates, based on objects that can be grasped which the recognition unit 151 has recognized from the shot image and handwritten information that the user has input to the shot image, an object to be grasped which has been requested to be grasped by the hand 124 from among the objects that can be grasped which the recognition unit 151 has recognized.

Figure 11:
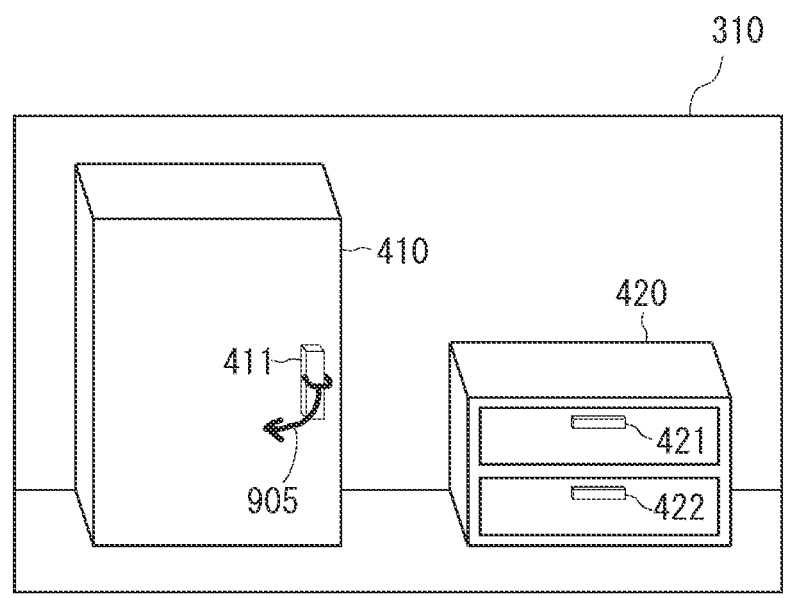
FIG. 11 is a diagram showing an example of handwritten information.

FIG. 11 is a diagram showing an example of handwritten information which a user has input to the shot image 310 of FIG. 9 in the remote terminal 300. In the example shown in FIG. 11, handwritten information 905 is input to a position of the knob 411 on the shot image 310. Therefore, the estimation unit 152 estimates that the object to be grasped which has been requested to be grasped by the hand 124 is the knob 411 among the knobs 411, 421, and 422 which the recognition unit 151 has recognized as the objects that can be grasped. Note that the estimation unit 152 can recognize the input position of the handwritten information 905 on the shot image 310 by any method. For example, if the remote terminal 300 includes, in the handwritten information 905, position information indicating the input position of the handwritten information 905 on the shot image 310 and transmits this handwritten information 905, the estimation unit 152 can recognize the input position of the handwritten information 905 based on this position information. Alternatively, if the remote terminal 300 transmits the shot image 310 processed into a state in which the handwritten information 905 has been input, the estimation unit 152 can recognize the input position of the handwritten information 905 based on this shot image 310.

Further, the estimation unit 152 obtains, from the image of the handwritten information which a user has input to the shot image, the meaning of the content of the motion of the robot 100 simulated by the handwritten information using the second learned model 182 read from the memory 180, and estimates the content of the motion with regard to the object to be grasped which is requested to be performed by the robot 100.

The second learned model 182 is a neural network learned from teaching data which is a combination of an image of handwritten information and the meaning of a content of a motion of the robot 100 simulated by the handwritten information. FIG. 12 is a diagram showing an example of training data for the second learned model 182. The example of the teaching data shown in FIG. 12 is teaching data for making the second learned model 182 learn three images indicating a grasping motion of "holding something", four images indicating a grasping motion of "opening something", and four images indicating a conveyance motion of "conveying something". Further, the second learned model 182 may be made to learn more detailed teaching data than the teaching data shown in FIG. 12. FIG. 13 is a diagram showing an example of teaching data for making the second learned model 182 learn in more detail a grasping motion of "holding something". The example of the teaching data shown in FIG. 13 is teaching data for making the second learned model 182 learn an image indicating a grasping motion of "holding something from above", an image indicating a grasping motion of "holding something from the side", and an image indicating a grasping motion of "holding something from diagonally above". Note that the second learned model 182 may be a neural network learned by deep learning. Further, teaching data may be added to the second learned model 182 as necessary so that it performs additional learning.

In the example shown in FIG. 11, the estimation unit 152 recognizes from the second learned model 182 that the handwritten information 904 means a grasping motion of "opening something". Therefore, the estimation unit 152 estimates that the content of the motion with regard to the object to be grasped which is requested to be performed by the robot 100 is the content of the motion of holding the knob 411, which is the object to be grasped, and opening the door.

A more detail of the method for estimating the content of the motion with regard to the object to be grasped which is requested to be performed by the robot 100 by the estimation unit 152 using movable and immovable areas of the robot 100 recognized by the recognition unit 151 will be described later.

(Outline of Image Adjustment Unit 153)

The image adjustment unit 153 changes a shooting direction and a shooting area by the stereo camera 131 according to handwritten information which a user has input to the shot image displayed on the display panel 341 of the remote terminal 300, and causes the display panel 341 of the remote terminal 300 to display the image shot by the stereo camera 131. The details of the image adjustment unit 153 will be described later.

As described above, in the control unit 150, the estimation unit 152 can estimate an object to be grasped which has been requested to be grasped by the hand 124 and the content of the motion with regard to the object to be grasped which is requested to be performed by the robot 100. Further, depending on the content of learning in the first learned model 181, the control unit 150 is able to obtain the distance to the object to be grasped and the direction in which the object to be grasped is located from the shot image acquired by the stereo camera 131. Note that the control unit 150 may obtain the distance to the object to be grasped and the direction in which the object to be grasped is located by performing an image analysis on the shot image of the first environment or from results of detection from other sensors. Further, the control unit 150 is also able to detect whether or not there are obstacles in the moving direction of the robot 100 by a detection signal received from the laser scanner 133.

Therefore, the control unit 150 generates, based on the distance to the object to be grasped, the direction in which the object to be grasped is located, the presence or absence of obstacles, and the like, a route for the robot 100 to move from its current position to the vicinity of the object to be grasped while avoiding obstacles, and transmits a driving signal corresponding to the generated route to the movable-base drive unit 145. The movable-base drive unit 145 moves the robot 100 to the vicinity of the object to be grasped in response to the driving signal.

At the timing when the robot 100 has moved to the vicinity of the object to be grasped, the control unit 150 makes preparations to start performing a motion for the object to be grasped which is requested to be performed by the robot 100. Specifically, first, the control unit 150 drives the arm 123 to a position where the hand camera 135 can observe an object to be grasped. Next, the control unit 150 causes the hand camera 135 to shoot an image of the object to be grasped and thus recognizes the state of the object to be grasped.

Then, the control unit 150 determines the detail of the motion of each part of the robot 100 for enabling the content of the motion with regard to the object to be grasped which is requested to be performed by the robot 100 based on the state of the object to be grasped and the content of the motion with regard to the object to be grasped which is requested to be performed by the robot 100.

For example, the control unit 150 generates a trajectory of the hand 124 for enabling the motion for grasping the object to be grasped by the hand 124. At this time, the control unit 150 generates a trajectory of the hand 124 so that it satisfies predetermined grasping conditions. The predetermined grasping conditions include conditions at the time when the hand 124 grasps the object to be grasped, conditions of the trajectory of the hand 124 until the hand 124 grasps the object to be grasped, and the like. Examples of the conditions at the time when the hand 124 grasps the object to be grasped include that the arm 123 is prevented from extending too much when the hand 124 grasps the object to be grasped. Further, examples of the conditions of the trajectory of the hand 124 until the hand 124 grasps the object to be grasped include, for example, that the hand 124 describes a straight trajectory when the object to be grasped is a knob for a drawer.

After the control unit 150 generates the trajectory of the hand 124, it transmits a driving signal corresponding to the generated trajectory to the upper-body drive unit 146. The hand 124 performs a motion for grasping the object to be grasped in response to the driving signal.

Alternatively, the control unit 150 generates a trajectory of the hand 124 and a moving route (traveling route) of the robot 100 for enabling the robot 100 to perform a motion for conveying an object to be grasped. In this case, the control unit 150 transmits a driving signal corresponding to the generated trajectory of the hand 124 to the upper-body drive unit 146 and transmits a driving signal corresponding to the moving route of the robot 100 that has been generated to the movable-base drive unit 145. The hand 124 and the robot 100 perform the motion for conveying the object to be grasped in response to these driving signals.

Figure 14:
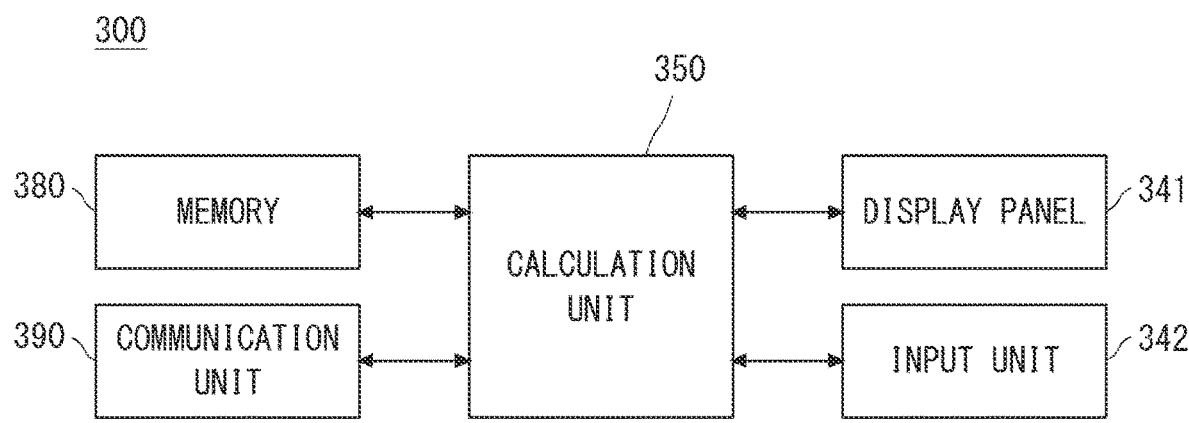
FIG. 14 is a block diagram showing an example of a block configuration of a remote terminal.

FIG. 14 is a block diagram showing an example of a block configuration of the remote terminal 300. Main elements related to processing for inputting handwritten information to the shot image received from the robot 100 will be described below. However, the remote terminal 300 may include elements in its configuration other than the above ones and may include additional elements that contribute to the processing for inputting handwritten information.

A calculation unit 350 is, for example, a CPU and performs control of the whole remote terminal 300 and various kinds of calculation processing by executing a control program read from a memory 380. The display panel 341 is, for example, a liquid crystal panel, and displays, for example, a shot image sent from the robot 100.

An input unit 342 includes a touch panel disposed so as to be superimposed on the display panel 141 and a push-button or the like provided on a peripheral part of the display panel 141. The input unit 342 passes, to the calculation unit 350, the handwritten information, which is an image that simulates the content of the motion of the robot 100 with regard to the object to be grasped, and which a user has input by touching the touch panel with his/her finger or a touch pen. Examples of the handwritten information are as shown in FIGS. 3 to 6.

The memory 380 is a nonvolatile storage medium. For example, a solid-state drive is used for the memory 380. The memory 380 stores, in addition to a control program for controlling the remote terminal 300, various parameter values, functions, lookup tables, and the like used for the control and the calculation.

A communication unit 390 is, for example, a wireless LAN unit and performs radio communication with the wireless router 700. The communication unit 390 receives the shot image sent from the robot 100 and passes it to the calculation unit 350. Further, the communication unit 390 cooperates with the calculation unit 350 to transmit handwritten information to the robot 100.

Referring next to FIGS. 15-18, overall processing of the remote control system 10 according to this embodiment will be described.

Figure 15:
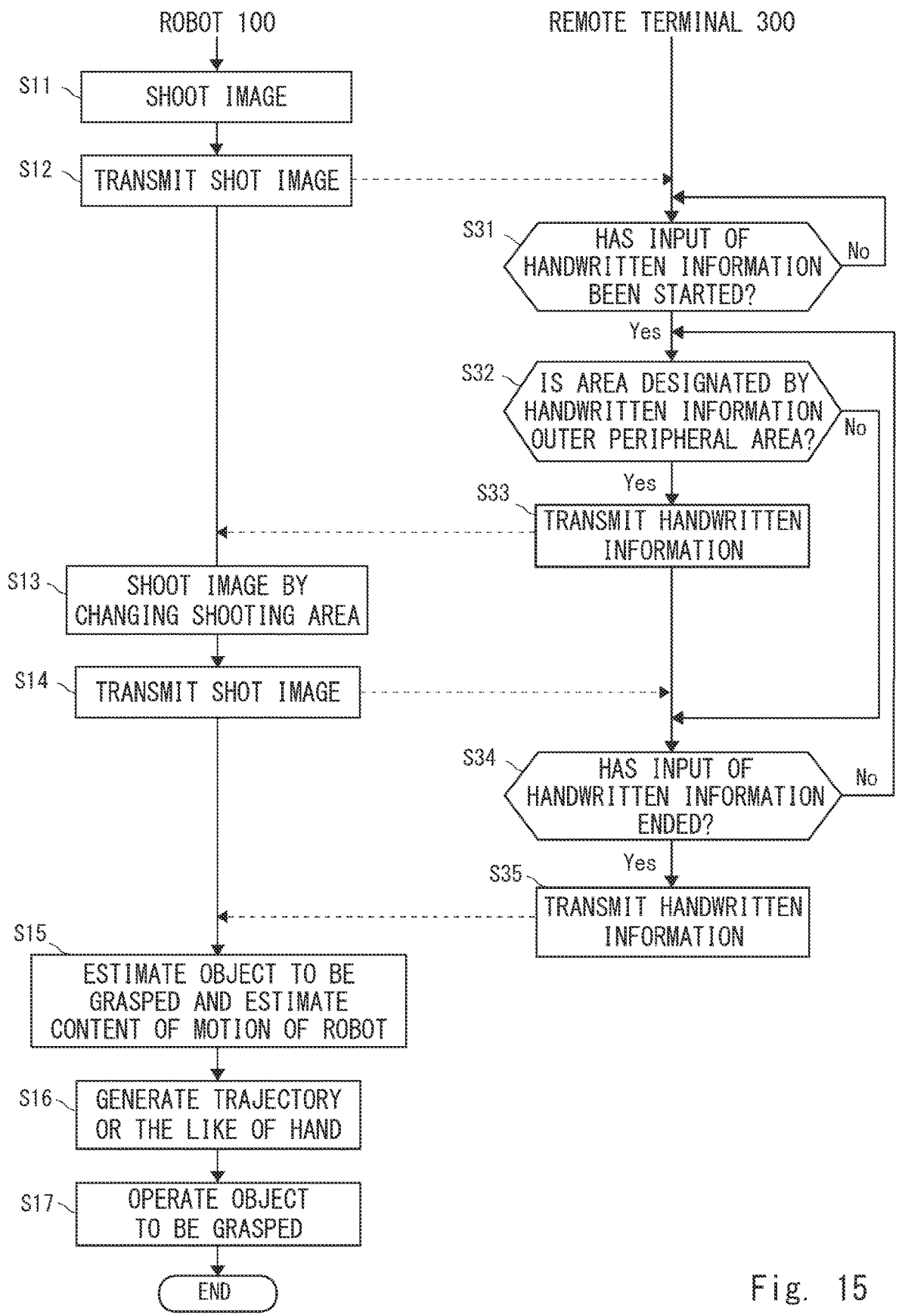
FIG. 15 is a flowchart showing an example of an overall flow of processing of the remote control system according to the first embodiment.

FIG. 15 is a flowchart showing an example of an overall flow of the processing performed by the remote control system 10 according to this embodiment. The flow on the left side thereof represents a flow of processing performed by the robot 100, and the flow on the right side thereof represents a flow of processing performed by the remote terminal 300. Further, dotted-line arrows indicate exchanges of handwritten information and a shot image between the robot 100 and the remote terminal 300 via the system server 500.

FIG. 16 is a diagram showing an example of the first environment in which a robot 100 is located. It is assumed, in the example of FIG. 16, that a robot 100 that is not shown is located in an area opposed to the paper surface in the first environment. Therefore, in the example shown in FIG. 16, the robot 100 is able to shoot an image of a first predetermined area A1 or a second predetermined area A2 using the stereo camera 131. In the following, a case in which the user causes the robot 100 to convey the object 402 placed on the table 400 onto the cabinet 420 by remote control will be described.

Further, FIGS. 17A to 17D are diagrams for describing a flow of input of handwritten information to the shot image displayed on the remote terminal 300. Further, FIG. 18 is a diagram showing an example of handwritten information finally input to the shot image displayed on the remote terminal 300.

In the robot 100, the control unit 150 shoots an image of the first predetermined area A1 in the first environment in which the robot 100 is located using the stereo camera 131 (Step S11) and transmits the shot image to the remote terminal 300 via the communication unit 190 (Step S12).

In the remote terminal 300, after the calculation unit 350 receives the shot image of the first predetermined area A1 transmitted from the robot 100, the calculation unit 350 displays the received shot image on the display panel 341. After that, the calculation unit 350 causes the display panel 341 to transit to a state in which handwritten information input to the shot image can be received (Step S31). After that, the user starts to input handwritten information to the shot image via the input unit 342, which is a touch panel (Yes in Step S31).

Here, when a part of the area designated by the handwritten information in the shot image displayed on the display panel 341 is a predetermined outer peripheral area 311 of the shot image displayed on the display panel 341 (Yes in Step S32), the calculation unit 350 transmits this handwritten information to the robot 100 via the communication unit 390 (Step S33).

Figure 17A:
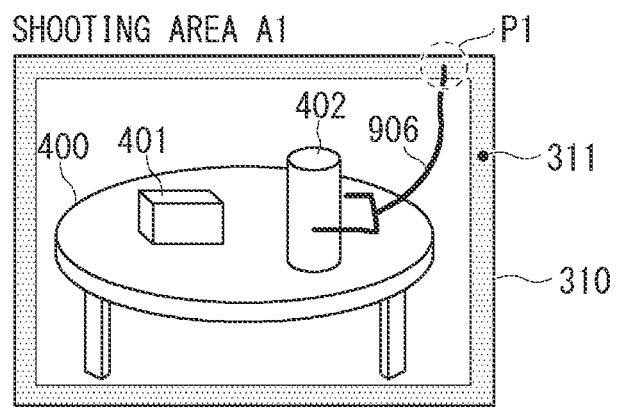
FIG. 17A is a diagram for describing a flow of input of handwritten information to the shot image displayed on the remote terminal.
Figure 18:
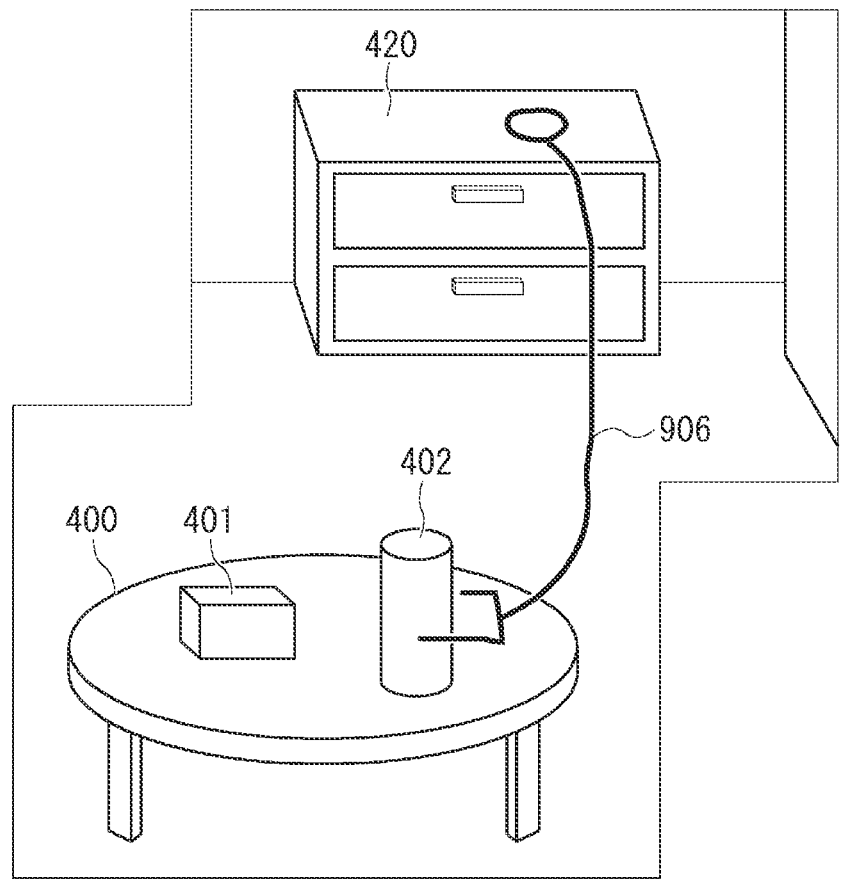
FIG. 18 is a diagram showing an example of handwritten information finally input to the shot image displayed on the remote terminal.

In the example shown in FIG. 17A, a part of an area P1 of the conveyance route of the object to be grasped 402 indicated by handwritten information 906 in the shot image of the predetermined area A1 displayed on the display panel 341 is a predetermined outer peripheral area 311 of the shot image displayed on the display panel 341 (Yes in Step S32). In this case, the calculation unit 350 transmits this handwritten information 906 to the robot 100 via the communication unit 390 (Step S33).

In this case, in the robot 100, the image adjustment unit 153 performs shooting using the stereo camera 131 by changing the shooting area from the first predetermined area A1 to the second predetermined area A2 (Step S13). The image adjustment unit 153 then transmits the shot image to the remote terminal 300 via the communication unit 190 (Step S14). Here, the image adjustment unit 153 adjusts, for example, the shooting direction and the shooting area of the stereo camera 131 in such a way that the second predetermined area A2 becomes an area that at least incudes the part of the area designated by the handwritten information and an area adjacent to the first predetermined area A1. The second predetermined area A2 may include a part or all of the first predetermined area A1.

In the remote terminal 300, after the calculation unit 350 receives the shot image of the second predetermined area A2 transmitted from the robot 100, the calculation unit 350 causes the display panel 341 to display the received shot image. That is, the calculation unit 350 switches the shot image to be displayed on the display panel 341 from the shot image of the first predetermined area A1 to the shot image of the second predetermined area A2.

Figure 17B:
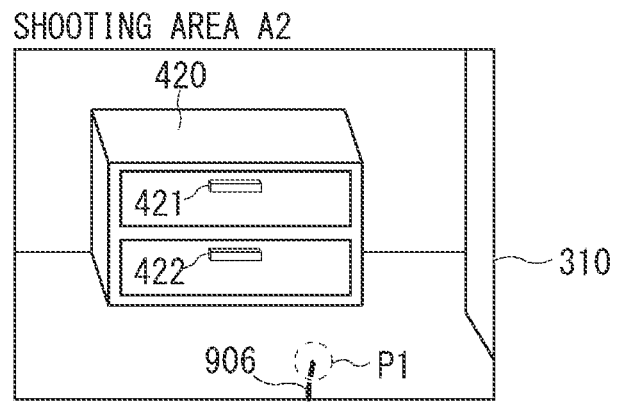
FIG. 17B is a diagram for describing a flow of input of handwritten information to the shot image displayed on the remote terminal.

In the example shown in FIG. 17B, the shot image displayed on the display panel 341 is switched from the shot image of the first predetermined area A1 to the shot image of the second predetermined area A2. Further, the shot image of the second predetermined area A2 is a shot image of an area including at least a part of the area P1 of the conveyance route of the object to be grasped 402 indicated by the handwritten information 906 and an area adjacent to the first predetermined area A1.

As described above, even when a part of the area of the shot image designated by the handwritten information is an area which has a low visibility, such as an area in an end of a shot image, the shot image displayed on the display panel 341 is switched according to the area designated by the handwritten information, whereby a high visibility is maintained. As a result, the user is able to input, for example, handwritten information over a wide range from the first predetermined area A1 to the second predetermined area A2.

Figure 17C:
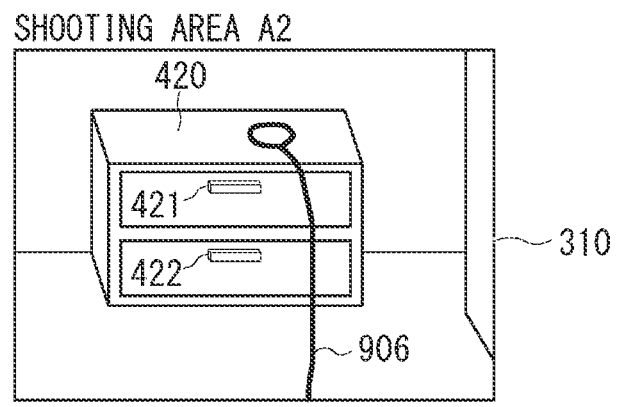
FIG. 17C is a diagram for describing a flow of input of handwritten information to the shot image displayed on the remote terminal.

In the example shown in FIG. 17C, the handwritten information 906 is continuously input from the first predetermined area A1 to the second predetermined area A2.

When the area designated in the handwritten information (e.g., a conveyance route of the object to be grasped indicated by the handwritten information) of the shot image displayed on the display panel 341 is not a predetermined outer peripheral area 311 of the shot image displayed on the display panel 341 (No in Step S32), the shot image displayed on the display panel 341 is not switched.

After that, when the user wants to end the input of the handwritten information to the shot image, the user performs a predetermined handwriting end operation. When the user wants to end the input of the handwritten information to the shot image, the user touches, for example, any part of the touch panel twice continuously in the manner of double clicking. Alternatively, the user keeps touching one place on the touch panel for a predetermined period of time or more. Alternatively, when an operation button is displayed on the display panel 341, the user touches an area of the touch panel on a button for ending the input of the handwritten information.

Figure 17D:
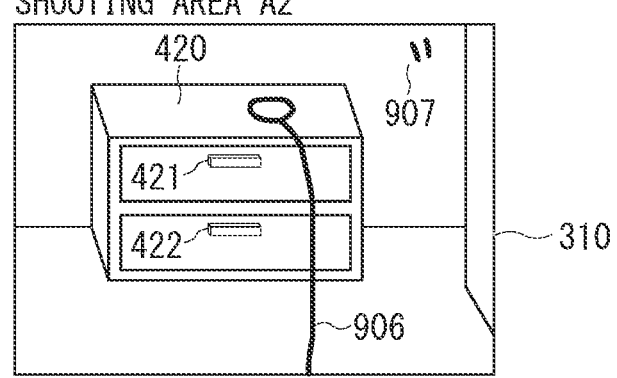
FIG. 17D is a diagram for describing a flow of input of handwritten information to the shot image displayed on the remote terminal.

In the example shown in FIG. 17D, as a predetermined handwriting end operation, the user touches any part of the touch panel twice continuously in the manner of double clicking, and inputs handwritten information 907 to the shot image.

According to the aforementioned configuration, the calculation unit 350 ends receiving the input of the handwritten information to the shot image (Yes in Step S34) and transmits the handwritten information 906 as shown in FIG. 18 to the robot 100 via the communication unit 390 (Step S35).

In the robot 100, after the recognition unit 151 receives the handwritten information input to the shot image, the handwritten information being transmitted from the remote terminal 300, the recognition unit 151 recognizes objects that can be grasped based on the shot image. The estimation unit 152 estimates, based on the objects that can be grasped which the recognition unit 151 has recognized from the shot image and the handwritten information input to the shot image, an object to be grasped which has been requested to be grasped by the hand 124 from among the objects that can be grasped which the recognition unit 151 has recognized and estimates the content of the motion with regard to the object to be grasped which is requested to be performed by the robot 100 (Step S15).

In the example shown in FIG. 18, the estimation unit 152 estimates the object 402 as an object to be grasped from among a plurality of objects that can be grasped which the recognition unit 151 has recognized and estimates that the content of the motion with regard to the object to be grasped which is requested to be performed by the robot 100 is to convey the object 402, which is the object to be grasped placed on the table 400, onto the cabinet 420.

After that, in the robot 100, the control unit 150 controls the movable-base drive unit 145 to move the robot 100 to the vicinity of the object to be grasped. When the robot 100 has moved to the vicinity of the object to be grasped, details of the motion of each part of the robot 100 for enabling a motion with regard to the object to be grasped which is requested to be performed by the robot 100 are determined.

The control unit 150 generates, for example, a trajectory of the hand 124 for enabling the hand 124 to perform a motion for grasping the object to be grasped (Step S16). After the control unit 150 generates the trajectory of the hand 124, it controls the upper-body drive unit 146 in accordance with the generated trajectory. According to the aforementioned configuration, the motion for grasping the object to be grasped by the hand 124 is performed (Step S17).

Alternatively, the control unit 150 generates a trajectory of the hand 124 and a moving route (traveling route) of the robot 100 for enabling the robot 100 to perform a motion for conveying an object to be grasped (Step S16). After the control unit 150 generates the trajectory of the hand 124 and the moving route of the robot 100, the control unit 150 controls the upper-body drive unit 146 and the movable-base drive unit 145 in accordance with these information items.

According to the aforementioned configuration, the motion for conveying the object to be grasped by the hand 124 and the robot 100 is performed (Step S17). In the example shown in FIG. 18 as well, the motion for conveying the object to be grasped by the hand 124 and the robot 100 is performed.

Figure 19:
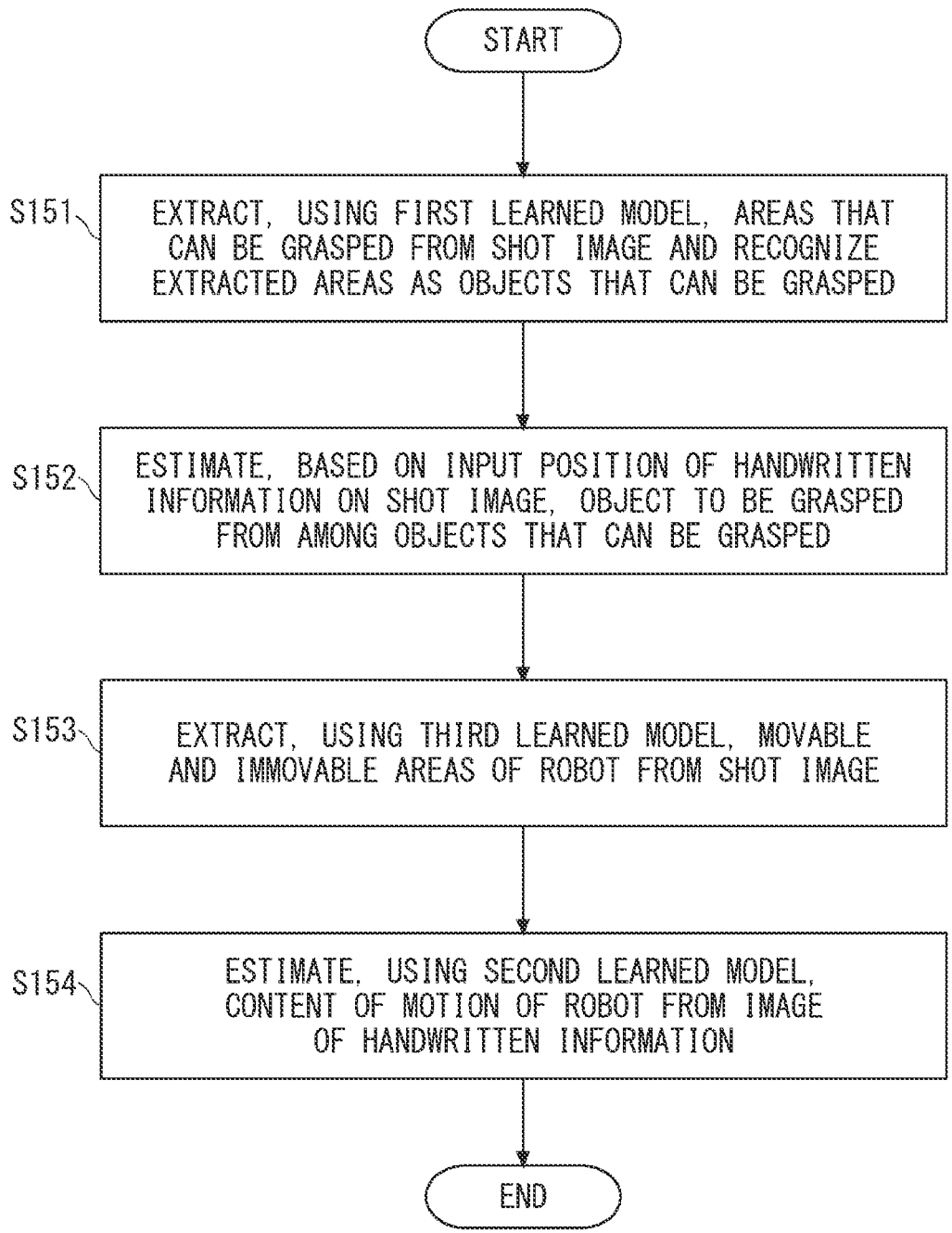
FIG. 19 is a flowchart showing an example of a detailed flow processing in Step S15 of FIG. 15.

Referring next to FIG. 19, details of the processing of Step S15 in FIG. 15 will be described. FIG. 19 is a flowchart showing an example of a detailed flow of the processing of Step S15 in FIG. 15 by the robot 100.

First, upon receiving handwritten information input to the shot image, the handwritten information being transmitted from the remote terminal 300, the recognition unit 151 extracts, using the first learned model 181 read from the memory 180, areas that can be grasped shown in the shot image, and recognizes the extracted areas as objects that can be grasped (Step S151).

Next, the estimation unit 152 estimates, based on the input position of the handwritten information on the shot image, an object to be grasped which has been requested to be grasped by the hand 124 from among objects that can be grasped which the recognition unit 151 has recognized (Step S152). Note that the input position of the handwritten information on the shot image is recognized using, for example, the method already described above.

Next, the recognition unit 151 extracts, using the third learned model 183 read from the memory 180, movable and immovable areas of the robot 100 shown in the shot image to which the handwritten information has been input, and recognizes these movable and immovable areas (Step S153). Note that the processing for recognizing movable and immovable areas of the robot 100 (segmentation processing) by the recognition unit 151 may be performed concurrently with the processing for recognizing objects that can be grasped.

FIG. 20 is a diagram showing an example of the movable and immovable areas of the robot 100 recognized by the recognition unit 151. The shot image 310 shown in FIG. 20 is an image of example in which processing for recognizing the movable and immovable areas of the robot 100 is performed on the shot image 310 shown in FIG. 6 by the recognition unit 151. In the shot image 310 shown in FIG. 20, a floor 450 is recognized as the movable area of the robot 100 and the table 400 is recognized as the immovable area of the robot 100. In the example shown in FIG. 20, the object to be grasped is estimated as the object 402.

Figure 21:
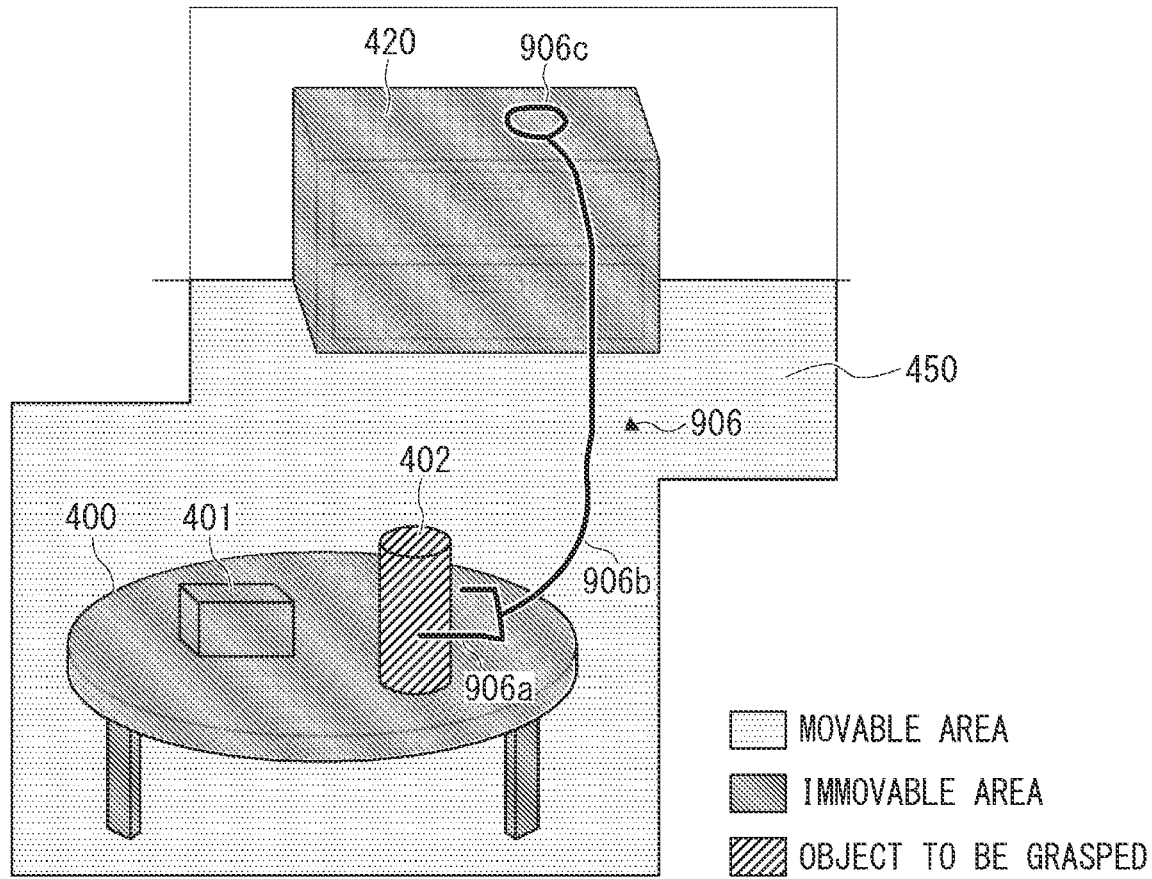
FIG. 21 is a diagram showing an example of movable and immovable areas of the robot recognized by the recognition unit.

Further, FIG. 21 shows another example of the movable and immovable areas of the robot 100 recognized by the recognition unit 151. The shot image shown in FIG. 21 is an example in which processing for recognizing the movable and immovable areas of the robot 100 is performed on the shot image shown in FIG. 18 by the recognition unit 151. In the shot image shown in FIG. 21, the floor 450 is recognized as the movable area of the robot 100 and the table 400 and the cabinet 420 are recognized as the immovable area of the robot 100. Further, an object that can be grasped (e.g., the object 402) other than the object 401, which is the object to be grasped, is also recognized as the immovable area. In the example shown in FIG. 21, the object to be grasped is estimated as the object 402.

Next, the estimation unit 152 obtains, using the second learned model 182 read from the memory 180, the meaning of the content of the motion of the robot 100 simulated by the handwritten information from the image of the handwritten information, and estimates the content of the motion with regard to the object to be grasped which is requested to be performed by the robot 100 (Step S154).

In the case of the example shown in FIG. 20, for example, the estimation unit 152 estimates, from the image of the handwritten information 904, that the content of the motion requested for the robot 100 is to convey the object 402, which is a grasping target indicated by the handwritten information 904a, to the destination indicated by the handwritten information 904c along a conveyance route indicated by the handwritten information 904b. In the example shown in FIG. 20, all the conveyance routes of the object 402 indicated by the handwritten information 904 are located in the immovable area of the robot 100. In this case, the estimation unit 152 estimates that all the conveyance routes of the object 402 indicated by the handwritten information 904 are moving routes by an arm operation by the hand 124 attached to the tip of the arm of the robot 100, not traveling routes of the robot 100.

Figure 22:
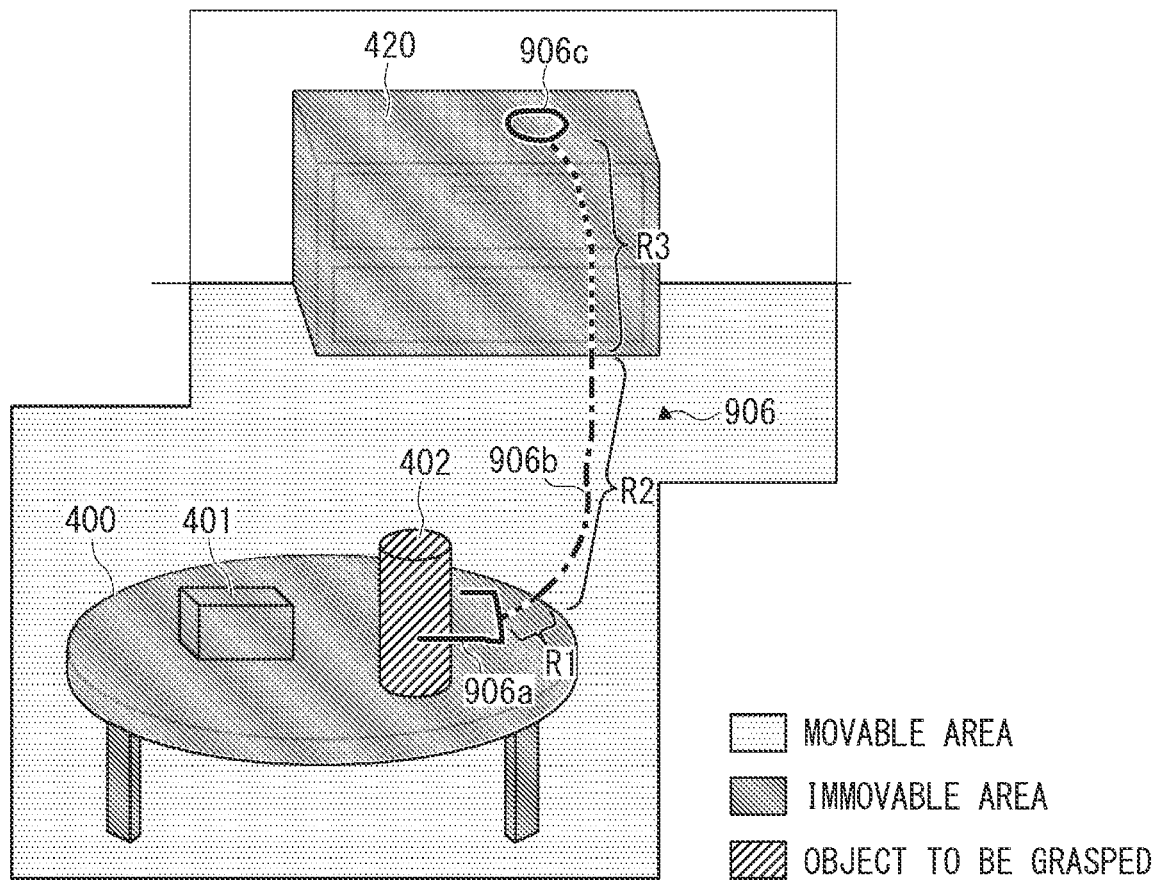
FIG. 22 is a diagram for describing a method for estimating a content of a motion of the robot using the movable and immovable areas of the robot recognized by the recognition unit.

Further, in the case of the example shown in FIG. 21, the estimation unit 152 estimates, from the image of the handwritten information 906, that the content of the motion requested for the robot 100 is to convey the object 402, which is a grasping target indicated by handwritten information 906a, to the destination indicated by handwritten information 906c along a conveyance route indicated by handwritten information 906b. Here, in the example shown in FIG. 21, some of the conveyance routes of the object 402 indicated by the handwritten information 906 are located in the movable area of the robot 100 and others are located in the immovable area of the robot 100. Specifically, as shown in FIG. 22, of the conveyance routes indicated by the handwritten information 906b, a conveyance route R2 is located in the movable area of the robot 100 and conveyance routes R1 and R3 are located in the immovable area of the robot 100. In this case, the estimation unit 152 estimates that, of the conveyance routes indicated by the handwritten information 906b, the conveyance route R2 that is positioned in the movable area of the robot 100 is a moving route (traveling route) of the robot 100 and estimates that the conveyance routes R1 and R3 that are positioned in the immovable area of the robot 100 are moving routes by an arm operation of the hand 124 attached to the tip of the arm of the robot 100.

Figure 23:
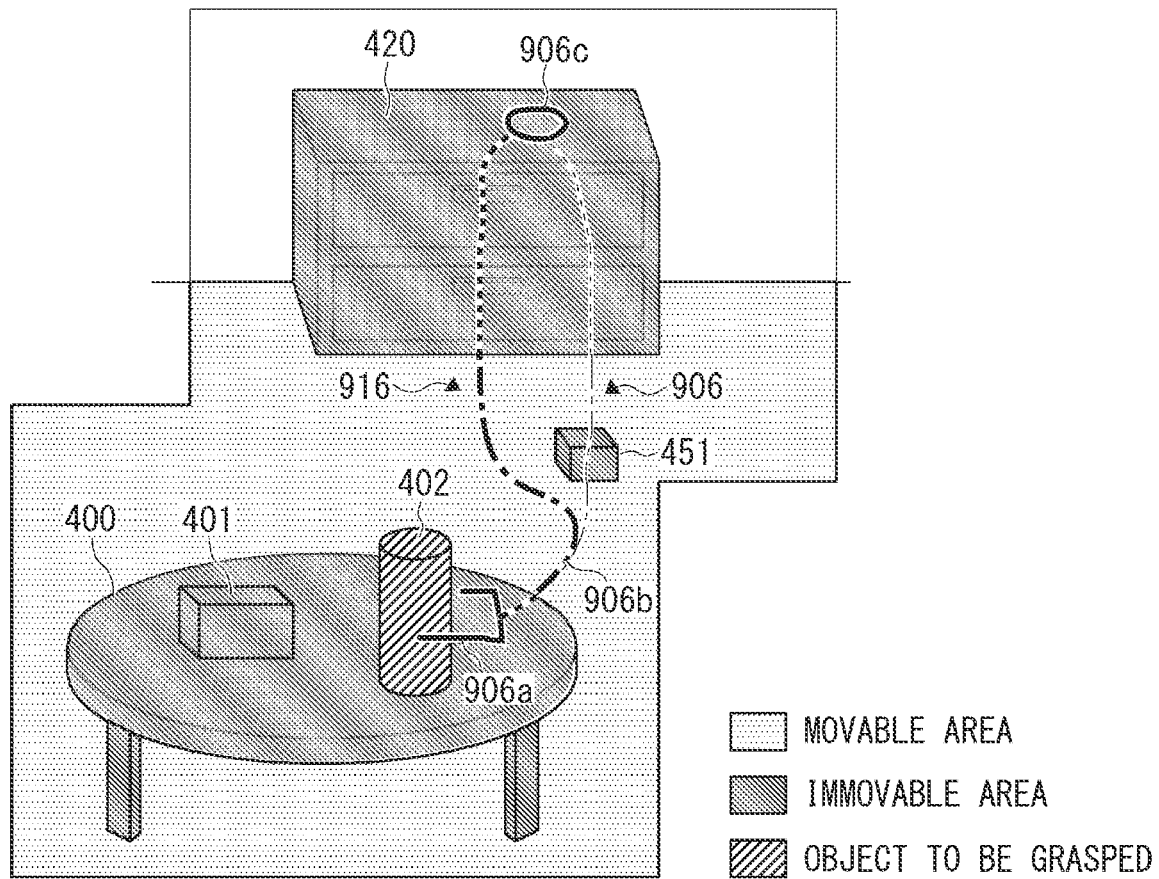
FIG. 23 is a diagram showing a detour route of an object to be grasped which is conveyed by the robot.

Note that the estimation unit 152 may estimate, when there is an immovable area held between two movable areas on a conveyance route indicated by handwritten information, a detour route of an object to be grasped where there is no immovable area held between two movable areas. The robot 100 includes an output unit that outputs information on this detour route and may cause, for example, the display panel 341 of the remote terminal 300 to display this information. In the example shown in FIG. 23, there is an immovable area (obstacle 451) held between two movable areas on a conveyance route indicated by the handwritten information 906. In this case, the estimation unit 152 may estimate, for example, a detour route 916 that avoids the obstacle 451 and propose this detour route 916 for the user.

As described above, in the remote control system 10 according to this embodiment, in the robot 100, the recognition unit 151 recognizes objects that can be grasped by the hand 124 based on a shot image of the environment in which the robot 100 is located. Further, the estimation unit 152 estimates, based on the objects that can be grasped which the recognition unit 151 has recognized from the shot image and handwritten information that the user has input to the shot image, an object to be grasped which has been requested to be grasped by the hand 124 from among the objects that can be grasped, and estimates the content of the motion (the grasping motion or the conveyance motion) with regard to the object to be grasped which is requested to be performed by the robot 100.

According to the aforementioned configuration, in the remote control system 10 according to this embodiment, a user performs more intuitive handwriting without him/her being required to recollect predetermined instruction figures and input them by handwriting, whereby it is possible to have the robot 100 execute desired processing such as conveying an object to be grasped.

Further, in the remote control system 10 according to this embodiment, the shot image displayed on the display panel 341 of the remote terminal 300 is switched according to the area designated by the handwritten information, whereby a high visibility is maintained and it is possible to input, for example, handwritten information over a wide range. That is, this remote control system 10 is able to improve the convenience of the operation.

Further, in the remote control system 10 according to this embodiment, when handwritten information includes information on a conveyance route of an object to be grasped, it is automatically determined whether the conveyance route indicates a moving route (traveling route) of the robot 100 or a moving route of the hand 124. Therefore, this remote control system 10 enables the robot 100 to execute highly accurate processing while also allowing a user to perform an intuitive operation.

Note that the present disclosure is not limited to the above-described embodiment and can be modified as appropriate without departing from the spirit of the present disclosure.

Figure 24:
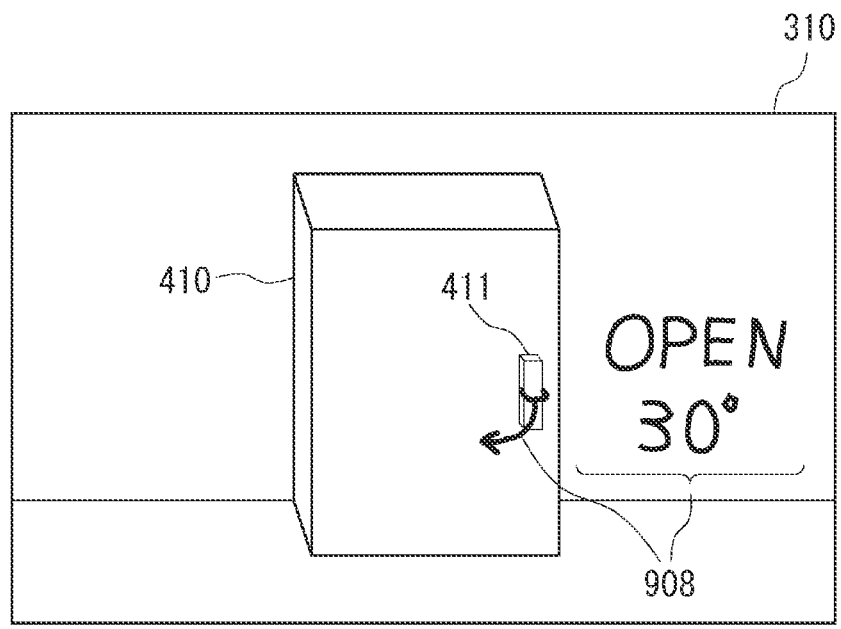
FIG. 24 is a diagram showing an example of handwritten information.

For example, in the above-described embodiment, handwritten information is an image that simulates a way of performing a motion for grasping an object to be grasped which is requested to be performed by the hand 124, but this is merely an example. The handwritten information may further include an image that shows a level of the grasping motion. In this case, the estimation unit 152 may further estimate a level of the motion for grasping an object to be grasped by the hand 124 based on the handwritten information. FIG. 24 is a diagram showing an example of handwritten information including an image that shows a level of the grasping motion. The example shown in FIG. 24 shows handwritten information 908 in which an image "30°" showing the level of the grasping motion is added to an image similar to the handwritten information 903 of FIG. 5. In the case of the example shown in FIG. 24, the estimation unit 152 estimates that a motion for grasping the knob 411 requested for the hand 124 is a motion for holding the knob 411 and then opening the door by 30°. This configuration enables a user to perform a more detailed and intuitive operation.

Figure 25:
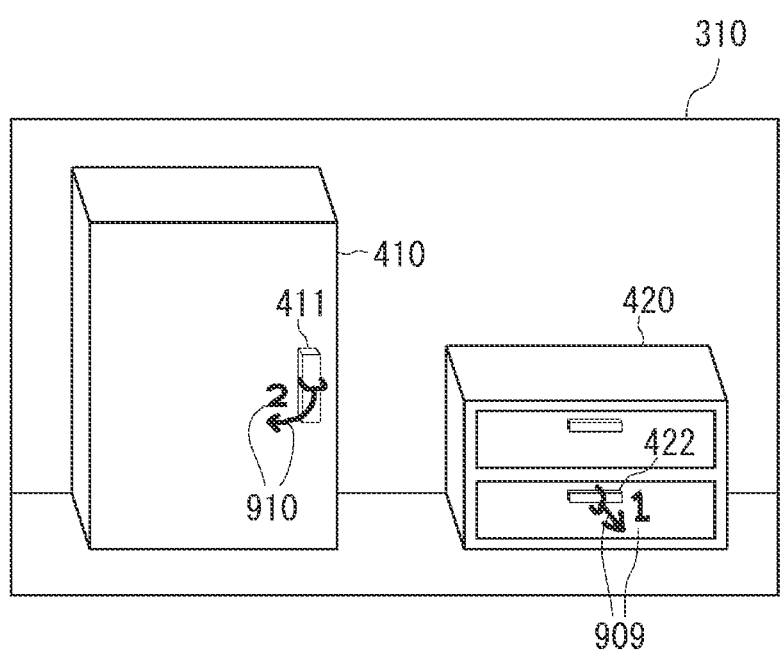
FIG. 25 is a diagram showing an example in which a plurality of handwritten information items are input.

Further, in the above-described embodiment, an example in which one piece of handwritten information is input to the shot image has been described, but this is merely an example. A plurality of handwritten information items may be input to the shot image. When a plurality of handwritten information items are input to the shot image, the estimation unit 152 estimates an object to be grasped and a content of a motion of the robot for each of the plurality of respective handwritten information items. At this time, the estimation unit 152 may estimate that the motion of the robot with regard to the object to be grasped estimated by the handwritten information input earlier is preferentially performed. Alternatively, each of the plurality of handwritten information items may further include an image showing the order of performing the grasping motions. In this case, the estimation unit 152 further estimates the order of performing the grasping motions based on the handwritten information. FIG. 25 shows an example in which a plurality of handwritten information items, each of which includes an image showing the order of performing the grasping motions, have been input. FIG. 25 shows an example in which two pieces of handwritten information of handwritten information 909 for the knob 422 and handwritten information 910 for the knob 411 are input to the shot image 310. Here, the handwritten information 909 includes an image of "1" showing the order of performing the grasping motions, and the handwritten information 910 includes an image of "2" showing the order of performing the grasping motions. Therefore, in the case of the example shown in FIG. 25, the estimation unit 152 estimates that the grasping motion (the motion for holding the knob 422 and then opening the drawer) which has been requested to be performed with regard to the knob 422 by the hand 124 is performed first and the grasping motion (the motion for holding the knob 411 and then opening the door) which has been requested to be performed with regard to the knob 411 by the hand 124 is performed second.

Further, in the above-described embodiment, three learned models of the first learned model 181, the second learned model 182, and the third learned model 183 are used, but this is merely an example. Instead of using the first learned model 181 and the second learned model 182, a transfer learned model in which the output of the first learned model 181 is applied to the second learned model 182 may be used. The transfer learned model is, for example, a model that uses a shot image to which handwritten information has been input as an input image and outputs objects that can be grasped shown in the shot image, an object to be grasped among the objects that can be grasped, and the meaning of the content of the motion with regard to the object to be grasped by the robot 100 simulated by the handwritten information.

Further, in the above-described embodiment, the robot 100 includes the recognition unit 151, the estimation unit 152, and the image adjustment unit 153, but this is merely an example. Some or all of the recognition unit 151, the estimation unit 152, and the image adjustment unit 153 may be included in the remote terminal 300 or in the system server 500.

Further, in the above-described embodiment, the robot 100 and the remote terminal 300 exchange a shot image and handwritten information via the Internet 600 and the system server 500, but this is merely an example. The robot 100 and the remote terminal 300 may exchange the shot image and handwritten information by direct communication.

Further, in the above-described embodiment, the imaging unit (the stereo camera 131) included in the robot 100 has been used, but this is merely an example. The imaging unit may be any imaging unit provided at any place in the first environment in which the robot 100 is located. Further, the imaging unit is not limited to a stereo camera and may be a monocular camera or the like.

Further, in the above-described embodiment, the example in which the device to be operated is the robot 100 including the hand 124 at the tip of the arm 123 as an end effector has been described, but this is merely one example. The device to be operated may be any object including an end effector and performing a grasping motion by using the end effector. Further, the end effector may be a grasping part (e.g., a suction part) other than a hand.

Further, the present disclosure may implement a part or all of the processing of the remote control system 10 by causing a Central Processing Unit (CPU) to execute a computer program.

The above-described program includes instructions (or software codes) that, when loaded into a computer, cause the computer to perform one or more of the functions described in the embodiments. The program may be stored in a non-transitory computer readable medium or a tangible storage medium. By way of example, and not a limitation, computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (registered trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A remote control system configured to remotely control a device to be operated comprising an end effector, the remote control system comprising:
   an imaging unit configured to shoot an image of an environment in which the device to be operated is located;
   a recognition unit configured to recognize objects that can be grasped by the end effector, a movable area of the device to be operated, and an immovable area of the device to be operated based on the shot image of the environment;

an operation terminal configured to display the shot image and receive handwritten information input to the shot image; and an estimation unit configured to estimate, based on the objects that can be grasped and the handwritten information, an object to be grasped which has been requested to be grasped by the end effector from among the objects that can be grasped and estimate a content of a motion with regard to the object to be grasped which is requested to be performed by the device to be operated, wherein the estimation unit estimates, when the handwritten information includes information on conveyance routes of the object to be grasped, a conveyance route that is positioned in the movable area of the device to be operated among the conveyance routes as a moving route of the device to be operated and estimates a conveyance route that is positioned in the immovable area of the device to be operated as a moving route of the end effector that grasps the object to be grasped.

2. The remote control system according to claim 1, wherein the estimation unit estimates, in a case in which the handwritten information includes information on conveyance routes of the object to be grasped and there is the immovable area held between the two movable areas on the conveyance route, a detour route of the object to be grasped where there is no immovable area held between the two movable areas, and the remote control system further comprises an output unit configured to output information on the detour route estimated by the estimation unit.

3. The remote control system according to claim 2, wherein the output unit causes the operation terminal to display the information on the detour route.

4. The remote control system according to claim 1, wherein the recognition unit recognizes objects that can be grasped other than the object to be grasped among the objects that can be grasped as an immovable area of the device to be operated.

5. The remote control system according to claim 1, wherein the device to be operated is an autonomously movable robot.

6. The remote control system according to claim 5, wherein the estimation unit estimates, when the handwritten information includes information on the conveyance routes of the object to be grasped, a conveyance route that is positioned in the movable area of the device to be operated among the conveyance routes as the moving route of the robot, which is the device to be operated, and estimates a conveyance route that is positioned in the immovable area of the device to be operated as a moving route of the end effector attached to a tip of an arm of the robot by an operation of the arm.

7. The remote control system according to claim 1, wherein the imaging unit is attached to the device to be operated.

8. The remote control system according to claim 1, wherein the imaging unit is provided in a place in the environment in which the device to be operated is located other than the place where the device to be operated is located in this environment.

9. The remote control system according to claim 1, wherein the operation terminal completes the input of the handwritten information upon receiving a predetermined handwriting end operation by a user.

10. The remote control system according to claim 1, wherein the handwritten information comprises a first image that simulates a content of a motion of the device to be operated with regard to the object to be grasped.

11. The remote control system according to claim 10, wherein the estimation unit estimates the content of the motion with regard to the object to be grasped which is requested to be performed by the device to be operated from the first image of the handwritten information using a learned model.

12. A remote control method by a remote control system configured to remotely control a device to be operated comprising an end effector, the remote control method comprising:

shooting an image of an environment in which the device to be operated is located;

recognizing, based on the shot image of the environment, objects that can be grasped by the end effector, a movable area of the device to be operated, and an immovable area of the device to be operated;

receiving, in an operation terminal that displays the shot image, handwritten information input to the displayed shot image; and estimating, based on the objects that can be grasped and the handwritten information, an object to be grasped which has been requested to be grasped by the end effector from among the objects that can be grasped and estimating a content of a motion with regard to the object to be grasped which is requested to be performed by the device to be operated, wherein in the estimation of the content of the motion with regard to the object to be grasped which is requested to be performed by the device to be operated, when the handwritten information includes information on conveyance routes of the object to be grasped, a conveyance route that is positioned in the movable area of the device to be operated among the conveyance routes is estimated as a moving route of the device to be operated and a conveyance route that is positioned in the immovable area of the device to be operated is estimated as a moving route of the end effector that grasps the object to be grasped.

13. A non-transitory computer readable medium storing a control program for causing a computer to execute remote control processing by a remote control system configured to remotely control a device to be operated comprising an end effector, the control program further causing a computer to perform the processing of:

shooting an image of an environment in which the device to be operated is located;

recognizing, based on the shot image of the environment, objects that can be grasped by the end effector, a movable area of the device to be operated, and an immovable area of the device to be operated;

receiving, in an operation terminal that displays the shot image, handwritten information input to the displayed shot image; and estimating, based on the objects that can be grasped and the handwritten information, an object to be grasped which has been requested to be grasped by the end effector from among the objects that can be grasped and estimating a content of a motion with regard to the object to be grasped which is requested to be performed by the device to be operated, wherein in the processing of estimating the content of the motion with regard to the object to be grasped which is requested to be performed by the device to be operated, when the handwritten information includes information on conveyance routes of the object to be grasped, a conveyance route that is positioned in the movable area of the device to be operated among the conveyance routes is estimated as a moving route of the device to be operated and a conveyance route that is positioned in the immovable area of the device to be operated is estimated as a moving route of the end effector that grasps the object to be grasped.

\* \* \* \* \*